US012374270B2

(12) United States Patent
Shin et al.

(10) Patent No.: US 12,374,270 B2
(45) Date of Patent: Jul. 29, 2025

(54) DISPLAY PANEL INCLUDING SUBPIXELS EACH HAVING FIRST AND SECOND LIGHT-EMITTING ELEMENTS, AND DISPLAY APPARATUS

(71) Applicant: LG Display Co., Ltd., Seoul (KR)

(72) Inventors: YoungKyu Shin, Paju-si (KR); SeonGeun Gim, Paju-si (KR); Solip Ju, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/429,027

(22) Filed: Jan. 31, 2024

(65) Prior Publication Data

US 2024/0257719 A1 Aug. 1, 2024

(30) Foreign Application Priority Data

Jan. 31, 2023 (KR) ........................ 10-2023-0013070

(51) Int. Cl.
*G09G 3/32* (2016.01)

(52) U.S. Cl.
CPC ....... *G09G 3/32* (2013.01); *G09G 2300/0819* (2013.01); *G09G 2300/0842* (2013.01); *G09G 2300/0861* (2013.01); *G09G 2310/0262* (2013.01); *G09G 2310/0297* (2013.01); *G09G 2310/08* (2013.01); *G09G 2320/028* (2013.01); *G09G 2330/021* (2013.01)

(58) Field of Classification Search
None
See application file for complete search history.

(56) References Cited

U.S. PATENT DOCUMENTS

2011/0284881 A1* 11/2011 Shikina ................ G09G 3/3233 257/E27.121
2018/0143354 A1* 5/2018 Li .......................... G02B 3/005
2020/0286448 A1* 9/2020 Kim .......................... G09G 5/10
2021/0193763 A1* 6/2021 Sun ...................... H10K 59/124
2021/0265537 A1* 8/2021 Shin ................... H10K 59/8731
2022/0139300 A1* 5/2022 Yokoyama ........... G09G 3/3233 345/214

FOREIGN PATENT DOCUMENTS

EP 4102573 A1 12/2022
JP 2008052058 A * 3/2008
KR 20190017501 A * 2/2019

* cited by examiner

*Primary Examiner* — Kirk W Hermann
(74) *Attorney, Agent, or Firm* — SEED IP LAW GROUP LLP

(57) ABSTRACT

Disclosed is a display panel in which a ratio of a plurality of areas capable of independently controlling a viewing angle in a display area may be adjusted. The display panel includes pixel blocks including subpixels and multiplexer circuits disposed in a bezel area and individually connected to the pixel blocks. The multiplexer circuits supplies first and second mode control signals to any one of the pixel blocks. The subpixels include a first light-emitting element connected to a driving transistor through a first mode control transistor controlled by the first mode control signal, a second light-emitting element connected to the driving transistor through a second mode control transistor controlled by the second mode control signal, a first lens area disposed on the first light-emitting element, and a second lens area disposed on the second light-emitting element.

22 Claims, 17 Drawing Sheets

DISPLAY PANEL INCLUDING SUBPIXELS EACH HAVING FIRST AND SECOND LIGHT-EMITTING ELEMENTS, AND DISPLAY APPARATUS

CROSS-REFERENCE TO RELATED APPLICATIONS

This application claims the benefit of the Korean Patent Application No. 10-2023-0013070 filed on Jan. 31, 2023, which is hereby incorporated by reference as if fully set forth herein.

BACKGROUND

Technical Field

The present disclosure relates to a display panel and a display apparatus, in which a viewing angle may be controlled.

Description of the Related Art

Electronic devices in various fields include display apparatuses that display images. For example, a plurality of display apparatuses for providing desired information or content to a driver and a passenger may be applied to a vehicle.

Among the display apparatuses mounted on a vehicle, the display apparatus disposed at the center of a dashboard is expanding in size. This display apparatus needs to selectively provide information or content to the driver and/or passenger in accordance with a driving situation of the vehicle. To this end, the display apparatus needs to control a viewing angle.

The above-described background is part of the present disclosure to devise the present disclosure or is technical information acquired by a process of devising the present disclosure but may not be regarded as the known art disclosed to the general public before the present disclosure is disclosed.

BRIEF SUMMARY

Various embodiments of the present disclosure provide a display panel and a display apparatus that substantially obviate one or more problems due to limitations and disadvantages of the related art.

Various embodiments of the present disclosure have been made in view of the above problems and various embodiments of the present disclosure provide a display panel and a display apparatus, in which a ratio of a plurality of areas capable of independently controlling a viewing angle in a display area may be adjusted.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a display panel comprising a plurality of pixel blocks including a plurality of subpixels disposed in a display area; and a plurality of multiplexer circuits disposed in a bezel area outside the display area and individually connected to the plurality of pixel blocks, wherein each of the plurality of multiplexer circuits may supply a first mode control signal and a second mode control signal to a corresponding one of the plurality of pixel blocks. Each of the plurality of subpixels may include a first light-emitting element connected to a driving transistor through a first mode control transistor controlled by the first mode control signal, a second light-emitting element connected to the driving transistor through a second mode control transistor controlled by the second mode control signal, a first lens area disposed on the first light-emitting element, and a second lens area disposed on the second light-emitting element.

In accordance with another aspect of the present disclosure, there is provided a display apparatus comprising a display panel including a plurality of pixel blocks including a plurality of subpixels disposed in a display area and a plurality of multiplexer circuits disposed in a bezel area outside the display area, supplying first and second mode control signals to each of the plurality of pixel blocks, and a data driver disposed in the bezel area, driving data lines disposed in the display area, wherein each of the multiplexer circuits may activate one of the first mode control signal and the second mode control signal in response to a control signal. Each of the plurality of subpixels may include a first light-emitting element connected to a driving transistor through a first mode control transistor controlled by the first mode control signal, a second light-emitting element connected to the driving transistor through a second mode control transistor controlled by the second mode control signal, a first lens area disposed on the first light-emitting element, and a second lens area disposed on the second light-emitting element.

In accordance with yet another aspect of the present disclosure, there is provided a display panel according to some aspects, including a plurality of pixel blocks, each including a plurality of subpixels disposed in a display area; and a control circuit disposed in a bezel area outside the display area and configured to supply a first mode control signal and a second mode control signal to the plurality of pixel blocks, wherein each of the plurality of subpixels includes: a first light-emitting element connected to a driving transistor through a first mode control transistor controlled by the first mode control signal; a second light-emitting element connected to the driving transistor through a second mode control transistor controlled by the second mode control signal; a first lens area disposed on the first light-emitting element; and a second lens area disposed on the second light-emitting element, wherein the first lens area and the second lens area are configured to differently control a viewing angle in a first direction.

It is to be understood that both the foregoing general description and the following detailed description of the present disclosure are exemplary and explanatory and are intended to provide further explanation of the disclosure as claimed.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

The above and other objects, features and other advantages of the present disclosure will be more clearly understood from the following detailed description taken in conjunction with the accompanying drawings, in which.

DETAILED DESCRIPTION

Figure 1:
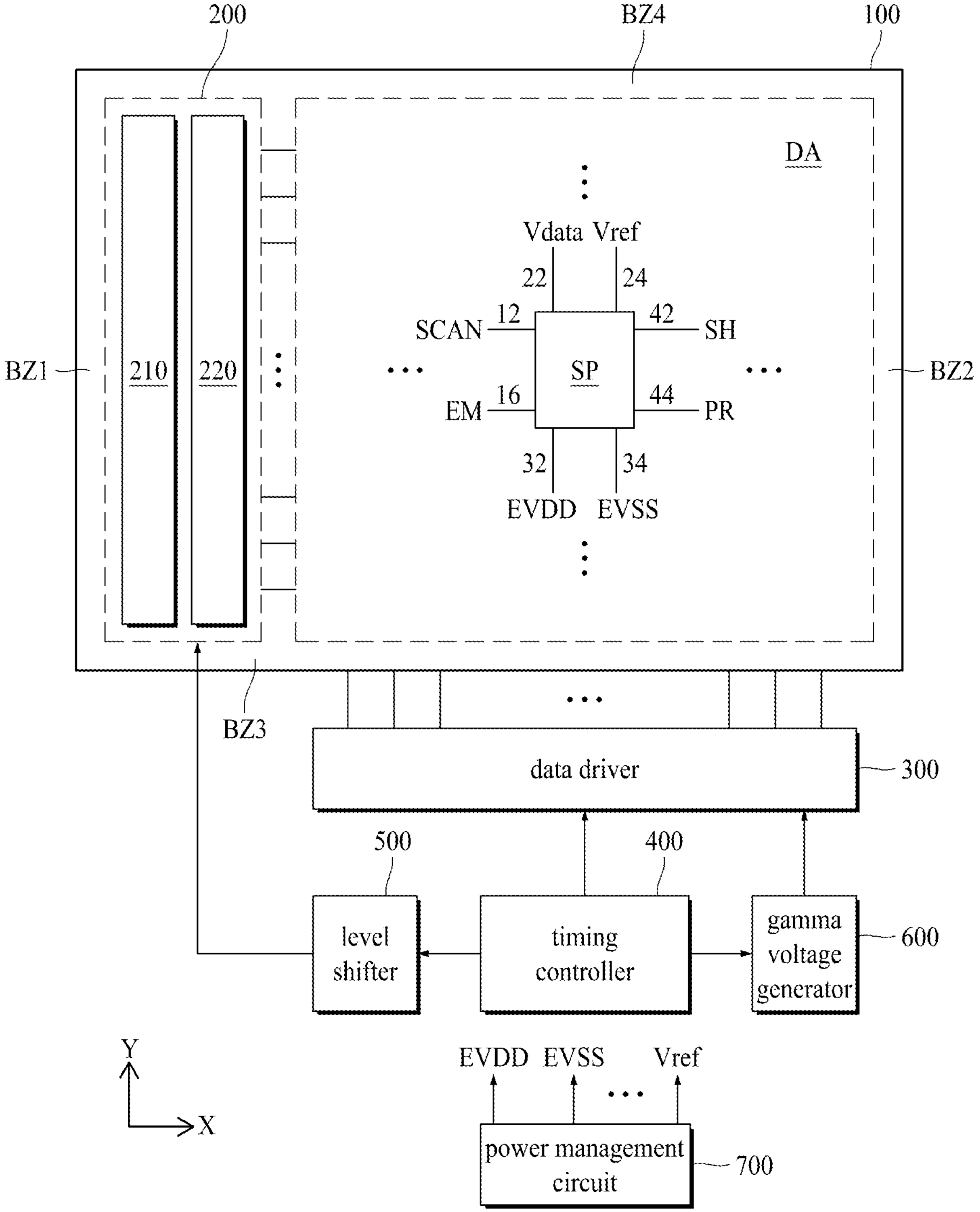
FIG. 1 is a schematic view illustrating a configuration of a display apparatus according to one embodiment.

Advantages and features of the present disclosure, and implementation methods thereof will be clarified through following aspects described with reference to the accompanying drawings. The present disclosure may however, be embodied in different forms and should not be construed as limited to the aspects set forth herein. Rather, these aspects are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing aspects of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted. In a case where "comprise," "have," and "include" described in the present specification are used, another part may be added unless "only" is used. The terms of a singular form may include plural forms unless referred to the contrary.

In construing an element, the element is construed as including an error range although there is no explicit description.

In describing a position relationship, for example, when a position relationship between two parts is described as "on," "over," "under," and "next," one or more other parts may be disposed between the two parts unless a more limiting term, such as "just" or "direct(ly)" is used.

In describing a time relationship, for example, when the temporal order is described as, for example, "after," "subsequent," "next," and "before," a case which is not continuous may be included unless a more limiting term, such as "just," "immediate(ly)" , or "direct(ly)" is used.

It will be understood that, although the terms "first," "second," etc., may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, the terms "first," "second," "A," "B," " (a)," " (b)," etc., may be used. These terms are intended to identify the corresponding elements from the other elements, and basis, order, or number of the corresponding elements should not be limited by these terms. As for the expression that an element or a layer is "connected," "coupled," or "adhered" to another element or layer, the element or layer may not only be directly connected, coupled or adhered to another element or layer, but also be indirectly connected, coupled or adhered to another element or layer with one or more intervening elements or layers "disposed" between the elements or layers, unless otherwise specified.

The term "at least one" should be understood as including any and all combinations of one or more among the associated listed elements. For example, the meaning of "at least one or more of a first element, a second element, and a third element" denotes the combination of all elements proposed from two or more of the first element, the second element, and the third element as well as the first element, the second element, or the third element.

Features of various aspects of the present disclosure may be partially or overall coupled to or combined with each other, and may be variously inter-operated with each other and driven technically as those skilled in the art may sufficiently understand. The aspects of the present disclosure may be carried out independently from each other, or may be carried out together in co-dependent relationship.

Hereinafter, the aspect of the present disclosure will be described with reference to the accompanying drawings. Since a scale of each of elements shown in the accompanying drawings is different from an actual scale for convenience of description, the present disclosure is not limited to the shown scale. Further, all the components of each display apparatus according to all aspects of the present disclosure are operatively coupled and configured.

FIG. 1 is a schematic view illustrating a configuration of a display apparatus according to one embodiment.

The display apparatus according to one embodiment may be an electroluminescent display apparatus that includes an organic light-emitting diode (OLED) display apparatus, a quantum-dot light-emitting diode display apparatus or an inorganic light-emitting diode display apparatus.

Referring to FIG. 1, the display apparatus according to one embodiment includes a display panel 100, a gate driver 200 embedded in the display panel 100, a data driver 300 connected to the display panel 100, a timing controller 400 controlling the gate driver 200 and the data driver 300, a gamma voltage generator 600, and a power management circuit 700. In one embodiment, the display apparatus may further include a level shifter 500 connected between the timing controller 400 and the gate driver 200. In one embodiment, the data driver 300, the timing controller 400, the gamma voltage generator 600 and the level shifter 500 may be integrated into a display driver.

The display panel 100 may be a rigid display panel, or may be a flexible display panel, of which shape may be modified, such as a foldable, bendable, rollable or stretchable display panel.

The display panel 100 may include a display area DA for displaying an image, and bezel areas BZ1 to BZ4 surrounding the display area DA, positioned at an outer portion.

The display panel 100 may display an image by using the display area DA in which the plurality of subpixels SP are arranged in a matrix form. A pixel matrix disposed in the display area DA may include a plurality of row lines including a plurality of subpixels SP arranged in a first direction X and a plurality of column lines including a plurality of subpixels arranged in a second direction Y.

Each subpixel SP may be any one of a red subpixel for emitting red light, a green subpixel for emitting green light, a blue subpixel for emitting blue light and a white subpixel for emitting white light. A unit pixel may include at least two subpixels.

A plurality of signal lines, which include a data line 22, gate lines 12 and 16, power lines 24, 32 and 34 and mode control lines 42 and 44, which are connected to each subpixel SP, may be disposed in the display panel 100.

The data line 22 may supply a data voltage Vdata supplied from the data driver 300 to each subpixel SP.

At least one gate line 12 of the gate lines 12 and 16 may supply a scan signal SCAN supplied from the gate driver 200 to each subpixel SP, and at least another one gate line 16 may supply an emission control signal EM supplied from the gate driver 200 to each subpixel SP.

Among the power lines 24, 32 and 34, an initialization voltage line 24 may supply an initialization voltage Vref supplied from the power management circuit 700 to each subpixel SP, and a first power line 32 may supply a first power voltage (high potential power voltage) EVDD to each subpixel SP, and a second power line 34 may supply a second power voltage (low potential power voltage) EVSS to each subpixel SP through a common electrode (cathode electrode).

A first mode control line 42 of the mode control lines 42 and 44 may supply a first mode control signal SH supplied from a control circuit (such as a multiplexer circuit) (not shown) to each subpixel SP, and a second mode control line 44 may supply a second mode control signal PR supplied from the control circuit (such as the multiplexer circuit) (not shown) to each subpixel SP. The control circuit (such as the multiplexer circuit) (not shown) may activate any one of the first and second mode control signals SH and PR in response to a control signal supplied from any one of the data driver 300 and the timing controller 400. This will be described later in detail.

Each subpixel SP may include first and second light-emitting elements, a pixel circuit, which includes a plurality of transistors for independently driving first and second light-emitting elements, a first lens area disposed on the first light-emitting element, and a second lens area disposed on the second light-emitting element. The first lens area has at least one lens disposed in the first lens area. Similarly, the second lens area has at least one lens disposed in the second lens area. The at least one lens of the first lens area and the second lens area may differently control a light emission angle, that is, a viewing angle.

For example, each subpixel SP may drive the first light-emitting element to implement a wide viewing angle mode or a share mode through the first lens area. Each subpixel SP may implement a narrow viewing angle mode or a privacy mode, in which the viewing angle is limited to be smaller than the wide viewing angle mode through the second lens area, by driving the second light-emitting element.

The display apparatus or the display panel 100 may control the viewing angle of each subpixel SP by selectively driving the first light-emitting element and the second light-emitting element of each subpixel SP by using the mode control signals SH and PR. The display apparatus or the display panel 100 may selectively drive the first and second light-emitting elements in each subpixel SP by using the mode control signals SH and PR, so that the display area DA may be driven by being divided into a plurality of areas capable of being controlled at different viewing angles, and a ratio or area of the plurality of areas may be freely adjusted in the first direction X and the second direction Y. This will be described later in detail.

For example, any one of the plurality of areas of the display area DA may operate in a wide viewing angle mode through the first lens area as the first light-emitting element is driven in each subpixel SP, and may operate in a narrow viewing angle mode through the second lens area when the second light-emitting element is driven. Another one of the plurality of areas may operate in the narrow viewing angle mode through the second lens area as the second light-emitting element is driven, and may operate in the wide viewing angle mode through the first lens area when the first light-emitting element is driven. Each of the plurality of areas may be driven in different viewing angle modes, or may be driven in the same viewing angle mode.

The display panel 100 according to one embodiment may further include a touch sensor screen disposed in the display area DA to sense a user's touch.

The display panel 100 according to one embodiment may be a touch display panel in which a touch sensor array is embedded. According to one embodiment of the present disclosure, the display panel 100 may include a pixel array including a circuit element layer having a plurality of transistors disposed on a substrate and a light-emitting element layer including a plurality of light-emitting elements disposed on the circuit element layer, an encapsulation layer disposed on the pixel array to seal the light-emitting element layer, a touch sensor array including a plurality of touch electrodes disposed on the encapsulation layer, and a lens array including first and second lenses disposed on the touch sensor array. The display panel 100 according to one embodiment may further include an optical film, an optical clear adhesive (OCA), a cover substrate and a protective film, which are sequentially disposed on the lens array. The display panel 100 according to one embodiment may further include a color filter array including a color filter and a black matrix, which are disposed between the touch sensor array and the lens array.

The gate driver 200 may be disposed in at least one of the plurality of bezel areas BZ1 and BZ2 positioned at the outer portion of the display area DA. For example, the gate driver 200 may be disposed in any one of the first and second bezel areas BZ1 and BZ2 facing each other with the display area DA interposed therebetween or may be disposed at both sides of the first and second bezel areas BZ1 and BZ2. The gate driver 200 may be disposed in a gate-in-panel (GIP) type including transistors formed in the same process as that of the transistors disposed in the display area DA.

The gate driver 200 may include a scan driver 210 for driving at least one gate line 12 of the plurality of gate lines 12 and 16 connected to the subpixels SP of each pixel row line, and an emission control driver 220 for driving at least other one gate line 16.

The number of the gate lines 12 and 16, the number of scan drivers 210 and the number of emission control drivers 220, which are connected to the subpixels SP of each pixel row line, are not limited to those shown in FIG. 1, and may be variously changed depending on a detailed configuration of the pixel circuit constituting each subpixel SP.

Each of the scan driver 210 and the emission control driver 220 may operate by receiving the plurality of gate control signals supplied from the timing controller 400 through the level shifter 500. In one embodiment, each of the scan driver 210 and the emission control driver 220 may be supplied with the plurality of gate control signals from the timing controller 400.

The level shifter 500 may receive control signals from the timing controller 400 and perform level shifting or logic processing for the received control signals to generate a plurality of gate control signals and supply the gate control signals to the scan driver 210 and the emission control driver 220.

The scan driver 210 may supply at least one scan signal SCAN to each of the plurality of pixel row lines by using the plurality of gate control signals supplied from the level shifter 500 or the timing controller 400. The scan driver 210 may supply the scan signal SCAN to at least one gate line 12 of the plurality of gate lines 12 and 16 connected to the subpixels SP of each pixel row line.

The emission control driver 220 may supply the plurality of emission control signals to each of the plurality of pixel lines by using the plurality of gate control signals supplied from the level shifter 500 or the timing controller 400. The emission control driver 220 may supply the emission control signal EM to any one gate line 16 of the plurality of gate lines 12 and 16 connected to the subpixels SP of each pixel row line.

At least one of a low temperature poly silicon (LTPS) transistor using an LTPS semiconductor or an oxide transistor using a metal-oxide semiconductor may be applied to the plurality of transistors disposed in the display area DA of the display panel 100 and the bezel areas BZ1 to BZ4 including the gate driver 200. The display panel 100 according to one embodiment may be configured such that the LTPS transistor and the oxide transistor coexist in order to reduce power consumption.

The gamma voltage generator 600 may generate a plurality of reference gamma voltages having different voltage levels and supply the reference gamma voltages to the data driver 300. The gamma voltage generator 600 may generate the plurality of reference gamma voltages corresponding to gamma characteristics of the display apparatus under the control of the timing controller 400 and supply the reference gamma voltages to the data driver 300. In one embodiment, the gamma voltage generator 600 may adjust reference gamma voltage levels in accordance with gamma data supplied from the timing controller 400 and output the reference gamma voltage levels to the data driver 300.

The data driver 300 may supply each data voltage Vdata to each data line 22 of the display panel 100 by converting digital data supplied from the timing controller 400 together with the data control signals into an analog data signal. The data driver 300 may subdivide the plurality of reference gamma voltages supplied from the gamma voltage generator 600 and convert the digital data into an analog data voltage by using the subdivided gamma voltages.

The data driver 300 may include at least one data drive integrated circuit (IC) for driving the plurality of data lines 22 disposed in the display panel 100. Each data drive IC may be packaged on each circuit film and connected to the display panel 100. The circuit film on which the data drive IC is packaged may be bonded and connected to a bezel area BZ3, in which a pad area of the display panel 100 is disposed, through an anisotropic conductive film (ACF). A chip on film (COF), a flexible printed circuit (FPC) or a flexible flat cable (FFC) may be used in the circuit film.

The timing controller 400 may control the gate driver 200 and the data driver 300 by using timing control signals supplied from a host system and timing setting information stored therein.

The timing controller 400 according to one embodiment may generate the plurality of gate control signals for controlling the driving timing of the gate driver 200 and supply the generated gate control signals to the gate driver 200. The timing controller 400 according to one embodiment may generate control signals for timing control and supply the control signals to the level shifter 500 so that the level shifter 500 may generate the plurality of gate control signals and supply the gate control signals to the gate driver 200.

The timing controller 400 may generate the plurality of data control signals for controlling the driving timing of the data driver 300 and supply the generated data control signals to the data driver 300. The timing controller 400 according to one embodiment may perform various kinds of image processing including image quality correction, degradation correction and luminance correction for decrease of power consumption by receiving input image data, and may supply the image-processed data to the data driver 300.

The power management circuit 700 may generate and supply a plurality of driving voltages required for the operation of all circuit elements of the display apparatus by using an input voltage. The power management circuit 700 may generate a first power voltage EVDD, a second power voltage EVSS and an initialization voltage Vref (reference voltage) to supply them to the display panel 100. The power management circuit 700 may generate and supply various driving voltages required for the operation of the gate driver 200, the data driver 300, the timing controller 400, the level shifter 500 and the gamma voltage generator 600.

Figure 2:
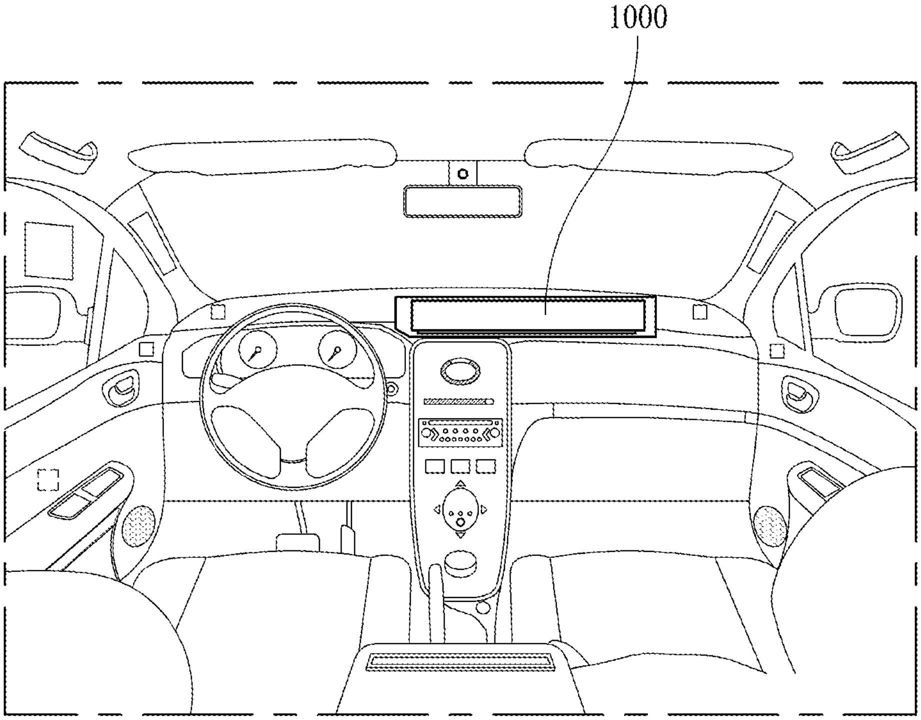
FIG. 2 is an exemplary view illustrating that a display apparatus according to one embodiment is applied to a vehicle.

FIG. 2 is an exemplary view illustrating a structure that a display apparatus according to one embodiment is applied to a vehicle, and FIGS. 3A to 3D are exemplary views illustrating various formats in which a ratio of first and second areas is changed in a display panel according to one embodiment. FIGS. 4A and 4B are perspective views illustrating a structure of first and second lenses of a subpixel according to one embodiment.

Figure 3A:
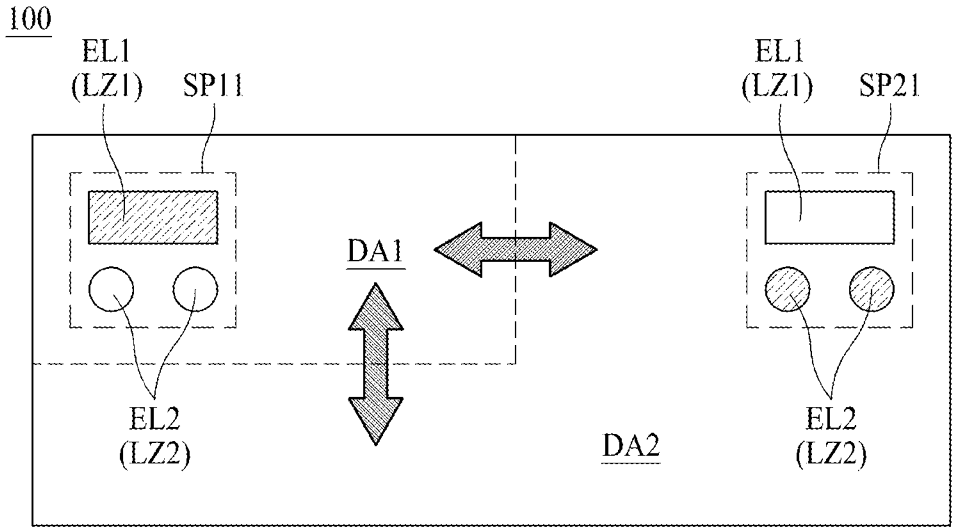
FIGS. 3A, 3B, 3C and 3D are exemplary views illustrating various formats in which a ratio of first and second areas is changed in a display panel according to one embodiment.
Figure 3B:
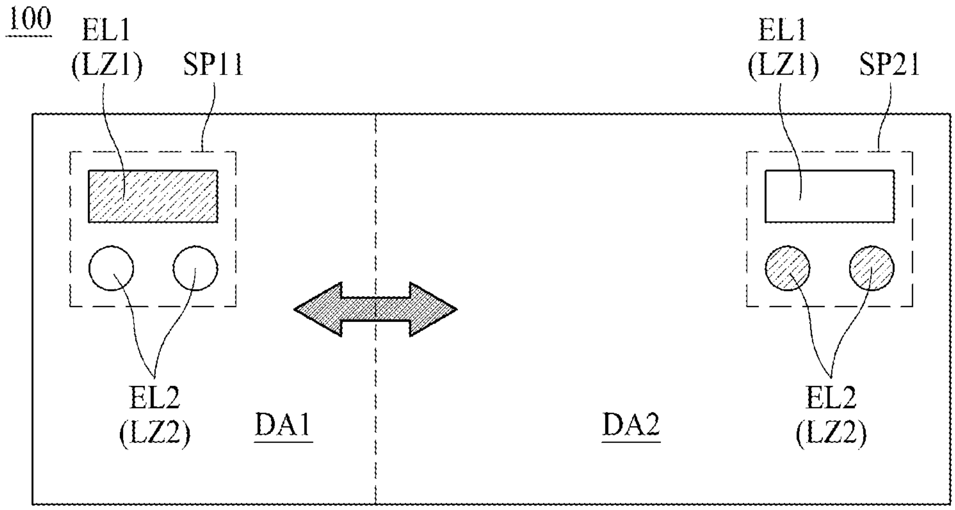
Figure 3C:
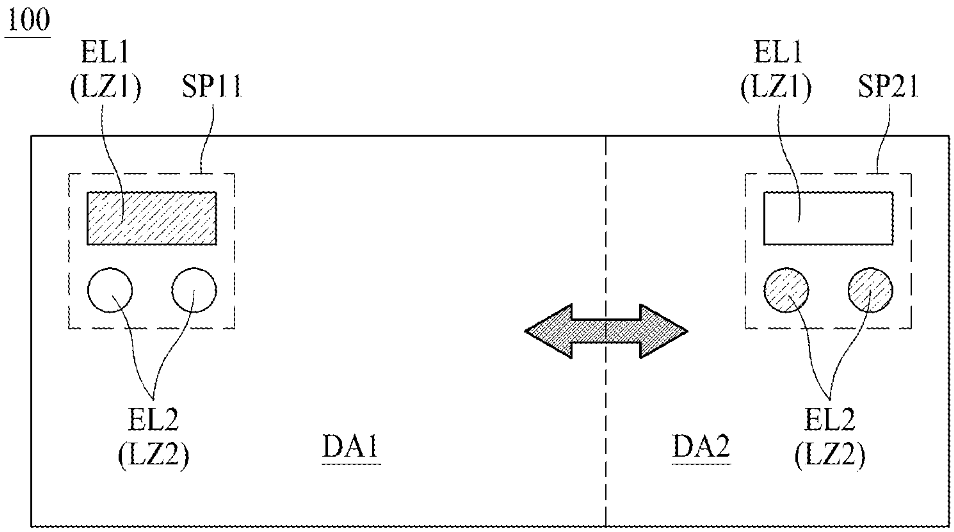
Figure 3D:
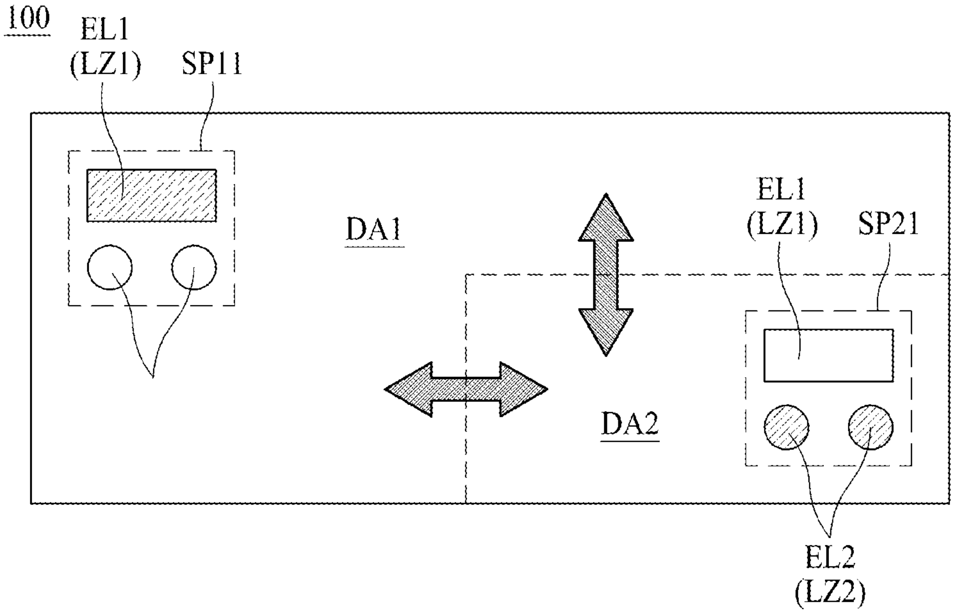
Figure 4A:
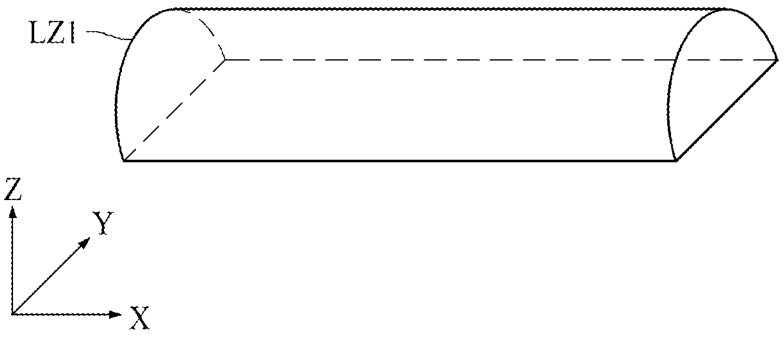
FIGS. 4A and 4B are perspective views illustrating a structure of first and second lenses of a display panel according to one embodiment.
Figure 4B:
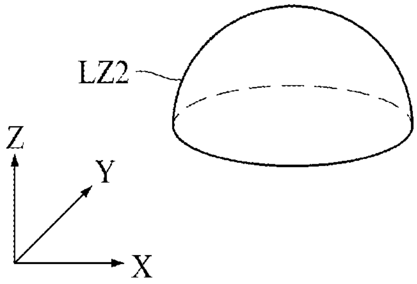

Referring to FIGS. 2 to 3D, a display apparatus 1000 according to one embodiment may be disposed at the center of a dashboard of a vehicle to provide an image to both a driver and a passenger of a passenger seat. The display panel 100 of the display apparatus 1000 may include a first area DA1 (also referred to as a first display area DA1) and a second display area DA2 (also referred to as a second display area DA2), and a ratio or size of the first area DA1 and the second area DA2 may vary in the first and second directions X and Y.

In one embodiment, the first area DA1 may be expressed as a Center Information Display (CID) area or a share mode area, and the second area DA2 may be expressed as a co-driver display (CDD) area or a switchable privacy mode area.

Referring to FIGS. 3A to 4B, each of a subpixel SP11 of the first area DA1 and a subpixel SP21 of the second area DA2 may include a first light-emitting element EL1, a second light-emitting element EL2, a first lens LZ1 disposed on the first light-emitting element EL1 and a second lens LZ2 disposed on the second light-emitting element EL2.

In the embodiment, the first lens LZ1 may be disposed on a light moving path of the first light-emitting element EL1. The second lens LZ2 may be disposed on a light moving path of the second light-emitting element EL2.

In each of the subpixels SP11 and SP21, the second light-emitting element EL2 may include a plurality of second light-emitting elements EL2 or a plurality of second light emission areas, and a plurality of second lenses LZ2 may be individually disposed on the plurality of second light-emitting elements EL2 or the plurality of second light emission areas. The plurality of second light-emitting elements EL2 or the plurality of second light emission areas may be connected in parallel in each of the subpixels SP11 and SP21.

In each of subpixels SP11 and SP21, an area in which the first lens LZ1 is disposed may be expressed as a first lens area, and an area in which a plurality of second lenses LZ2 are disposed may be expressed as a second lens area.

Referring to FIG. 4A, the first lens LZ1 may be a half-cylindrical lens long in the first direction X. Referring to FIG. 4B, the second lens LZ2 may be a half-spherical lens.

In FIGS. 4A and 4B, the first direction X may be expressed as a left-right direction, a horizontal direction, a parallel direction or X-axis direction. The second direction Y may be expressed as an up and down direction, a longitudinal direction, a vertical direction or Y-axis direction. The third direction Z may be expressed as a front-rear direction, a thickness direction of the display panel 100 or Z-axis direction.

The first lens LZ1 and the second lens LZ2 may differently control (limit) a viewing angle in the left-right direction X and equally control (limit) a viewing angle in the up and down direction Y.

For example, the first lens LZ1 may control the viewing angle at a wide viewing angle as a moving path of light emitted from the first light-emitting element EL1 is not limited within a specific angle in the left-right direction X. The second lens LZ2 may control the viewing angle at a narrow viewing angle as a moving path of light emitted from the second light-emitting element EL2 is limited within a specific angle in the left-right direction X.

The first lens LZ1 and the second lens LZ2 may limit the moving path of the light within a specific angle in the up and down direction Y, thereby controlling the viewing angle at a narrow viewing angle. Therefore, in one embodiment, when the display apparatus 1000 is applied to the vehicle as shown in FIG. 2, it is possible to prevent the driver's view from being disturbed as images displayed on the first and second areas DA1 and DA2 of the display panel 100 are reflected by a windshield of the vehicle.

When the first light-emitting element EL1 is driven in each of the subpixels SP11 and SP21, the corresponding subpixel may operate in the wide viewing angle mode in which the viewing angle of the left-right direction X is not limited. When the second light-emitting element EL2 is driven in each of the subpixels SP11 and SP21, the corresponding subpixel may operate in the narrow viewing angle mode in which the viewing angle in the left-right direction X is limited. The wide viewing angle mode may be expressed as a first mode, and the narrow viewing angle mode may be expressed as a second mode.

In each of the subpixels SP11 and SP21, driving of the first light-emitting element EL1 and driving of the second light-emitting element EL2 are switched based on the mode control signals (SH and PR in FIG. 1) so that each of the subpixels SP11 and SP21 may switch the driving of the wide viewing angle and the driving of the narrow viewing angle.

Referring to FIGS. 3A to 3D, the display apparatus 1000 according to one embodiment may selectively drive the first and second light-emitting elements EL1 and EL2 in each subpixel SP11 and SP21 by using the mode control signals (SH and PR in FIG. 1), thereby independently controlling the viewing angle of the first area DA1 and the second area DA2 and freely adjusting the ratio or area of the first area DA1 and the second area DA2 in the display panel 100 in the left-right direction (the first direction X) and the up and down direction (the second direction Y).

For example, the first area DA1 of the display panel 100 may provide the driver and the passenger of the passenger seat with an image having a wide viewing angle in the left-right direction X as the first light-emitting element EL1 corresponding to the first lens LZ1 is driven in each subpixel SP11.

The second area DA2 of the display panel 100 may provide the passenger of the passenger seat with an image having a narrow viewing angle in the left-right direction X so as not to disturb the driver's driving as the second light-emitting element EL2 corresponding to the second lens LZ2 is driven in each subpixel SP21.

In one embodiment, when the driver does not drive, in accordance with a user's selection, the first area DA1 and the second area DA2 of the display panel 100 may provide the driver and the passenger with an image having a wide viewing angle in the left-right direction X as the first light-emitting element EL1 corresponding to the first lens LZ1 is driven in each of the subpixels SP11 and SP21.

The display apparatus 1000 according to one embodiment is not limited to a display apparatus for a vehicle, and may be applied to various display apparatuses such as a mobile display, an IT display and a TV display.

Figure 5:
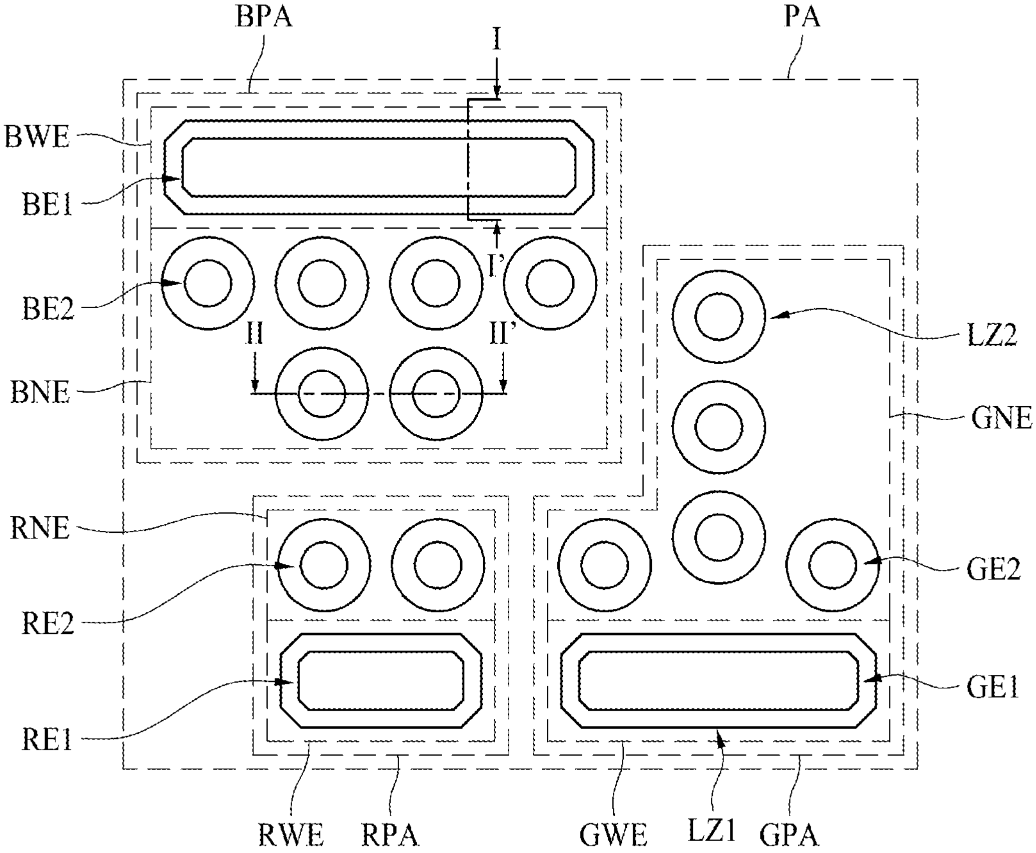
FIG. 5 is an exemplary plan view illustrating a pixel structure of a display panel according to one embodiment.
Figure 6:
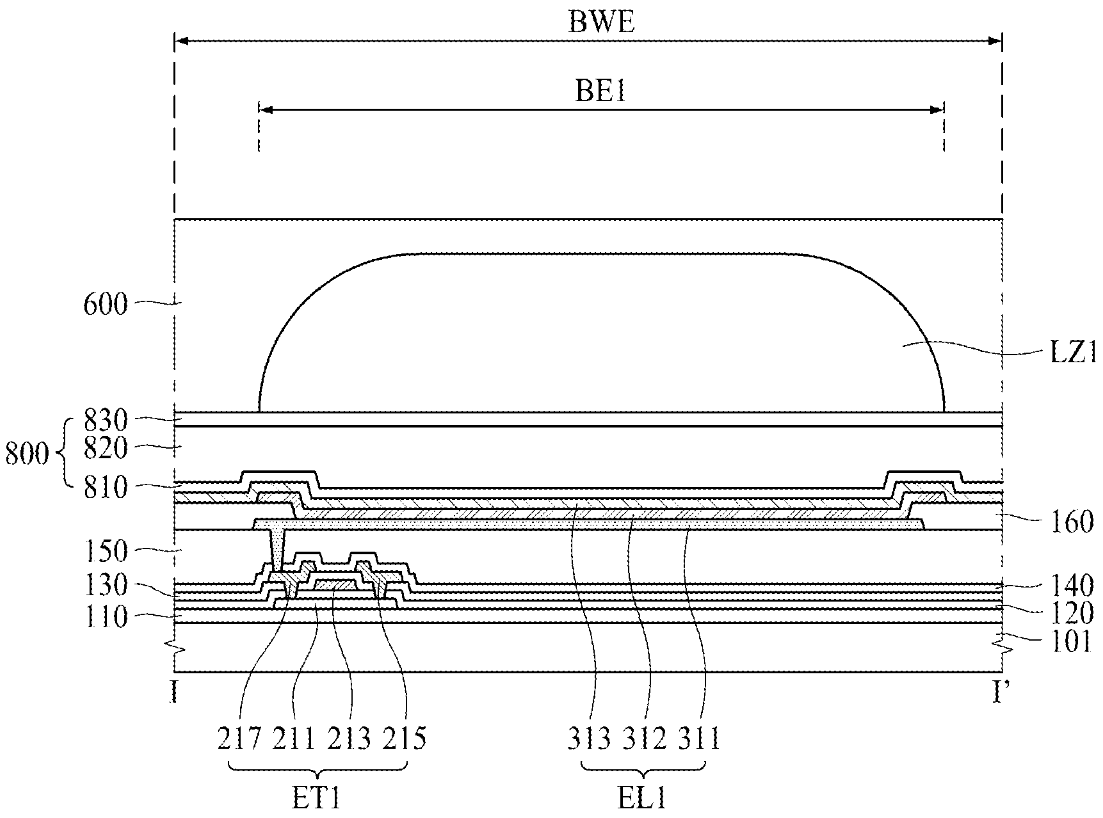
FIG. 6 is a cross-sectional view illustrating a first lens area taken along line I-I' shown in FIG. 5.
Figure 7:
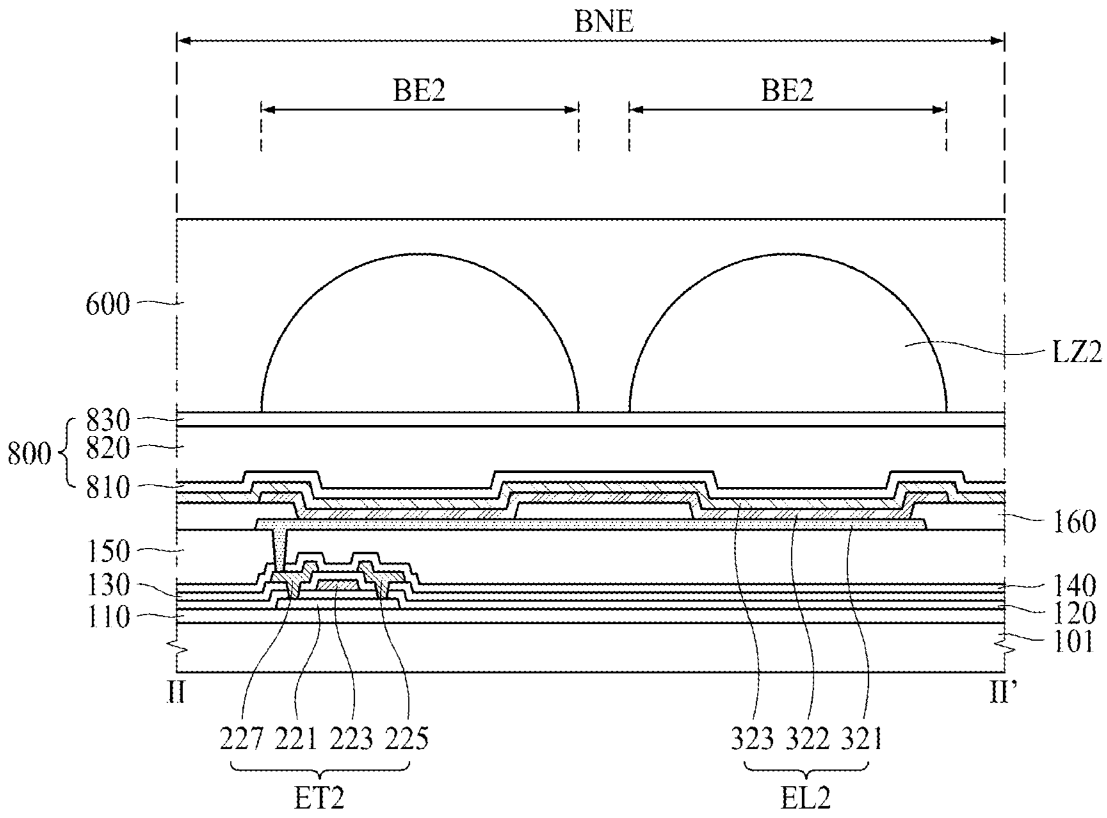
FIG. 7 is a cross-sectional view illustrating a second lens area taken along line II-II' shown in FIG. 5.

FIG. 5 is an exemplary plan view illustrating a pixel structure of a display panel according to one embodiment, FIG. 6 is a cross-sectional view illustrating a first lens area taken along line I-I' shown in FIG. 5, and FIG. 7 is a cross-sectional view illustrating a second lens area taken along line II-II' shown in FIG. 5.

Referring to FIG. 5, a pixel area PA or a pixel according to one embodiment may include a blue (B) subpixel area BPA for emitting blue light, a red (R) subpixel area RPA for emitting red light and a green (G) subpixel area GPA for emitting green light. The R, G and B subpixel areas RPA, GPA and BPA may be expressed as a first type subpixel, a second type subpixel and a third type subpixel, respectively.

The B subpixel area BPA may include a first lens area BWE including a first light emission area BE1 of the first light-emitting element EL1 and a first lens LZ1 disposed on the first light emission area BE1 to overlap the first light emission area BE1, and a second lens area BNE including a second lens LZ2 disposed on the second light emission area BE2 of the second light-emitting element EL2 to overlap the second light emission area BE2.

The R subpixel area RPA may include a first lens area RWE including a first light emission area RE1 of the first light-emitting element EL1 and a first lens LZ1 disposed on the first light emission area RE1 to overlap the first light emission area RE1, and a second lens area RNE including a second light emission area RE2 of the second light-emitting element EL2 and a second lens LZ2 disposed on the second light emission area RE2 to overlap the second light emission area RE2.

The G subpixel area GPA may include a first lens area GWE including a first light emission area GE1 of the first light-emitting element EL1 and a first lens LZ1 disposed on the first light emission area GE1 to overlap the first light emission area GE1, and a second lens area GNE including a second light emission area GE2 of the second light-emitting element EL2 and a second lens LZ2 disposed on the second light emission area GE2 to overlap the second light emission area GE2.

As described above with reference to FIGS. 4A and 4B, the first lens LZ1 and the second lens LZ2 may control the viewing angle differently in the left-right direction X, and may control the viewing angle equally in the up and down direction Y.

The first lens areas BWE, RWE and GWE of the pixel area PA may include the first light emission area BE1, RE1 and GE1 and a first lens LZ1, respectively. Each of the second lens areas BNE, RNE and GNE of the pixel area PA may include a plurality of second light emission areas BE2, RE2 and GE2 and a plurality of second lenses LZ2.

Each of the first light emission areas BE1, RE1 and GE1 included in the first lens areas BWE, RWE and GWE of each pixel area PA may have a shape the same as or similar to a lower surface of the first lens LZ1. The size of the first lens LZ1 may be set to be larger than that of each of the first light emission areas BE1, RE1 and GE1, so that emission efficiency of light generated from each of the first emission areas BE1, RE1 and GE1 may be improved.

Each of the second light emission areas BE2, RE2 and GE2 included in the second lens areas BNE, RNE and GNE of each pixel area PA may have a shape the same as or similar to a lower surface of the second lens LZ2 . The size of the second lens LZ2 may be set to be larger than that of each of the second light emission areas BE2, RE2 and GE2, so that emission efficiency of light generated from each of the second light emission areas BE2, RE2 and GE2 may be improved.

In the embodiment, the second light emission areas BE2, RE2 and GE2 included in the second lens areas BNE, RNE and GNE of each pixel area PA may have the same area, and the number of the second light emission areas BE2, RE2 and GE2 may be different for each of the subpixel areas RPA, GPA and BPA. For example, the number of the second light emission areas BE2 disposed in the second lens area BNE of the B subpixel area BPA may be larger than the number of the second light emission areas RE2 disposed in the second lens area RNE of the R subpixel area RPA, and may be larger than the number of the second light emission areas GE2 disposed in the second lens area GNE of the G subpixel area GPA. The number of the second light emission areas GE2 disposed in the second lens area GNE of the G subpixel area GPA may be larger than the number of the second light emission areas RE2 disposed in the second lens area RNE of the R subpixel area RPA. Therefore, an efficiency deviation of the second R, G and B light-emitting elements in each pixel area PA may be supplemented by the number of the second light emission areas BE2, RE2 and GE2 disposed in the second lens areas BNE, RNE and GNE of each pixel area PA.

In the embodiment, the sizes of the first light emission areas BE1, RE1 and GE1 may be different for each of the subpixel areas RPA, GPA and BPA. For example, the size of the first light emission area BE1 of the B subpixel area BPA may be greater than the size of the first light emission area RE1 of the R subpixel area RPA and may be greater than the size of the first light emission area GE1 of the G subpixel area GPA. The size of the first light emission area GE1 of the G subpixel area GPA may be greater than the size of the first light emission area RE1 of the R subpixel area RPA. Therefore, the efficiency deviation of the first R, G and B light-emitting elements in each pixel area PA may be supplemented by the sizes of the first light emission areas BE1, RE1, GE1 disposed in the first lens areas BWE, RWE and GWE of each pixel area PA.

As shown in FIGS. 6 and 7, the display panel 100 according to one embodiment may include a substrate 101, a circuit element layer including transistors ET1 and ET2 disposed on the substrate 101, a light-emitting element layer including light-emitting elements EL1 and EL2 disposed on the circuit element layer, an encapsulation layer 800 disposed on the light-emitting element layer, and a lens layer including lenses LZ1 and LZ2 disposed on the encapsulation layer 800. The display panel 100 according to one embodiment may further include a touch sensor layer (not shown) disposed between the encapsulation layer 800 and the lens layer. The display panel 100 according to one embodiment may further include a color filter layer (not shown) that includes a color filter and a black matrix, which are disposed between the touch sensor layer and the lens layer.

A cross-sectional structure of the B subpixel area BPA of the R, G and B subpixel areas RPA, GPA and BPA in the display panel according to one embodiment will be described with reference to FIGS. 6 and 7. The R, G and B subpixel areas RPA, GPA and BPA may have the same cross-sectional structure.

Each subpixel area BPA of the display panel according to one embodiment may include a first lens area BWE shown in FIG. 6 and a second lens area BNE shown in FIG. 7.

Referring to FIG. 6, the first lens area BWE of the subpixel area BPA (see FIG. 5) may include a first mode control transistor ET1 of the pixel circuit, a first light-emitting element EL1 connected to the first mode control transistor ET1, and a first lens LZ1 disposed to overlap the first light emission area BE1 on the first light-emitting element EL1.

Referring to FIG. 7, the second lens area BNE of the subpixel area BPA (see FIG. 5) may include a second mode control transistor ET2 of the pixel circuit, a second light-emitting element EL2 connected to the second mode control transistor ET2, and a plurality of second lenses LZ2 disposed to overlap the plurality of second light emission areas BE2 on the second light-emitting element EL2.

The circuit element layer disposed on the substrate 101 in the display panel according to one embodiment may include a plurality of insulating layers stacked on the substrate 101. For example, the plurality of insulating layers may include a buffer layer 110, a gate insulating layer 120, an interlayer insulating layer 130, a passivation layer 140 and a planarization layer 150.

The substrate 101 may include an insulating material such as glass or plastic. The plastic substrate may be formed of a flexible material. For example, the substrate 101 may include at least one organic insulating material of an acrylic resin, an epoxy-based resin, a siloxane-based resin, a polyimide-based resin or a polyamide-based resin.

The buffer layer 110 may have a single-layered structure or a multi-layered structure, which includes an inorganic insulating material such as silicon oxide (SiOx), silicon nitride (SiNx) and aluminum oxide (Al2O3). The buffer layer 110 may prevent impurities such as hydrogen from flowing into semiconductor layers 211 and 221 through the substrate 101.

The transistors ET1 and ET2 may be disposed on the buffer layer 110.

The first mode control transistor ET1 includes a semiconductor layer 211, a gate electrode 213, a source electrode 215 and a drain electrode 217, which are disposed on the buffer layer 110. The second mode control transistor ET2 includes a semiconductor layer 221, a gate electrode 223, a source electrode 225 and a drain electrode 227, which are disposed on the buffer layer 110. The gate insulating layer 120 is disposed between the semiconductor layers 211 and 221 and the gate electrodes 213 and 223. The interlayer insulating layer 130 is disposed between the gate electrodes 213 and 223 and the source and drain electrodes 215, 217, 225 and 227. The source electrode 215 and the drain electrode 217 of the first mode control transistor ET1 may be connected to a source area and a drain area of the semiconductor layer 211 through contact holes passing through the interlayer insulating layer 130 and the gate insulating layer 120, respectively. The source electrode 225 and the drain electrode 227 of the second mode control transistor ET2 may be connected to a source area and a drain area of the semiconductor layer 221 through contact holes passing through the interlayer insulating layer 130 and the gate insulating layer 120, respectively.

The semiconductor layers 211 and 221 may include polycrystalline silicon, or may include an oxide semiconductor material. The semiconductor layers 211 and 221 may include low temperature polysilicon (LTPS). The semiconductor layers 211 and 221 may include at least one of IZO(InZnO)-based, IGO(InGaO)-based, ITO(InSnO)-based, IGZO(InGaZnO)-based, IGZTO(InGaZnSnO)-based, GZTO(GaZnSnO)-based, GZO(GaZnO)-based or ITZO(InSnZnO)-based oxide semiconductor material. A light blocking layer (not shown) may be further disposed below the semiconductor layers 211 and 221.

The gate insulating layer 120 may include an inorganic insulating material such as silicon oxide (SiOx) and silicon nitride (SiNx). The gate insulating layer 120 may include a material having a high dielectric constant. For example, the gate insulating layer 120 may include a high-k material such as hafnium oxide (HfO). The gate insulating layer 120 may have a multi-layered structure.

Gate lines (not shown) connected to the gate electrodes 213 and 223 may be disposed on the gate insulating layer 120.

The interlayer insulating layer 130 may include an inorganic insulating material such as silicon oxide (SiOx) and silicon nitride (SiNx). The interlayer insulating layer 130 may have a multi-layered structure.

Data lines (not shown) and power lines (not shown), which are connected to the source electrodes 215 and 225 or the drain electrodes 217 and 227, may be disposed on the interlayer insulating layer 130.

The passivation layer 140 and the planarization layer 150 may be stacked on the first and second mode control transistors ET1 and ET2. The passivation layer 140 may include an inorganic insulating material such as silicon oxide (SiOx) and silicon nitride (SiNx). The planarization layer 150 may include an organic insulating material different from the passivation layer 140, and may provide a flat surface.

A light-emitting element layer, which includes the first light-emitting element EL1 and the second light-emitting element EL2, may be disposed on the planarization layer 150.

The first light-emitting element EL1 includes a first electrode 311 disposed on the planarization layer 150, a light-emitting layer 312 disposed on the first electrode 311, and a second electrode 313 disposed on the light-emitting layer 312. The second light-emitting element EL2 includes a first electrode 321 disposed on the planarization layer 150, a light-emitting layer 322 disposed on the first electrode 321, and a second electrode 323 disposed on the light-emitting layer 322. The first light-emitting element EL1 and the second light-emitting element EL2, which are disposed in the respective subpixel areas BPA, may emit light of the same color.

The first electrode 311 of the first light-emitting element EL1 may be connected to any one of the source electrode 215 and the drain electrode 217 of the first mode control transistor ET1 through a contact hole passing through the planarization layer 150 and the passivation layer 140. The first electrode 321 of the second light-emitting element EL2 may be connected to any one of the source electrode 225 and the drain electrode 227 of the second mode control transistor ET2 through the contact hole passing through the planarization layer 150 and the passivation layer 140.

The first electrodes 311 and 321 may include a conductive material having high reflectivity. The first electrodes 311 and 321 may include a metal such as aluminum (Al), silver (Ag), titanium (Ti) and silver-palladium-copper (APC) alloy. The first electrodes 311 and 321 may further include a transparent conductive material such as indium tin oxide (ITO) or indium zinc oxide (IZO). For example, the first electrodes 311 and 321 may have a multi-layered structure (Ti/Al/Ti) of titanium (Ti) and aluminum (Al), a multi-layered structure (ITO/Al/ITO) of ITO and aluminum (Al) or a multi-layered structure (ITO/APC/ITO) of ITO and APC.

The light-emitting layers 312 and 322 may include an emission material layer (EML) including a light-emitting material. The light-emitting material may include an organic material, an inorganic material or a hybrid material. The light-emitting layer 312 of the first light-emitting element EL1 and the light-emitting layer 322 of the second light-emitting element EL2 may be spaced apart from each other. Therefore, light emission due to a leakage current may be avoided.

The light-emitting layers 312 and 322 may have a multi-layered structure. For example, the light-emitting layers 312 and 322 may further include at least one of a hole injection layer (HIL), a hole transport layer (HTL), an electron transport layer (ETL) or an electron injection layer (EIL).

The second electrodes 313 and 323 may include a conductive material for transmitting light. The second electrodes 313 and 323 may include a transparent conductive material such as ITO or IZO. The second electrodes 313 and 323 may include Al, Mg, Ag or their alloy, and may have a thin thickness capable of transmitting light. Therefore, the light generated from each of the light-emitting layers 312 and 322 may be emitted through each of the second electrodes 313 and 323.

The first electrode 311 of the first light-emitting element EL1 may be spaced apart from the first electrode 321 of the second light-emitting element EL2, and a bank insulating layer 160 may be positioned between the first electrodes 311 and 321. The bank insulating layer 160 may cover edges of each of the first electrodes 311 and 321. The bank insulating layer 160 may include an organic insulating material. The bank insulating layer 160 may include an organic material different from that of the planarization layer 150, and may have a single layered structure or a double layered structure.

The bank insulating layer 160 may include an opening through which the first electrode 311 is exposed, thereby defining the first light emission area BE1. The light-emitting layer 312 and the second electrode 313 of the first light-emitting element EL1 may be stacked on the first electrode 311 exposed by the opening of the bank insulating layer 160.

The bank insulating layer 160 may include an opening through which the first electrode 321 of the second light-emitting element EL2 is exposed, thereby defining the second light emission area BE2. In one embodiment, the bank insulating layer 160 may include a plurality of openings on the first electrode 321 of the second light-emitting element EL2, thereby defining the plurality of second light emission areas BE2. The light-emitting layer 322 and the second electrode 323 of the second light-emitting element EL2 may be stacked on the first electrode 321 exposed by the opening of the bank insulating layer 160. The light-emitting layer 322 and the second electrode 323 of the second light-emitting element EL2 may overlap the first electrode 321 with the bank insulating layer 160 interposed therebetween. In the second lens area BNE, the plurality of second light emission areas BE2 are independently disposed to be spaced apart from each other by the bank insulating layer 160, but may share the first electrode 321 of the second light-emitting element EL2, share the light-emitting layer 322 of the second light-emitting element EL2 and share the second electrode 323 of the second light-emitting element EL2. Therefore, light emission efficiency of the second light emission areas BE2 may be improved. A size of the second light emission area BE2 may be smaller than a size of the first light emission area BE1.

The second electrode 313 of the first light-emitting element EL1 may be a common electrode electrically connected to the second electrode 323 of the second light-emitting element EL2.

The encapsulation layer 800 may be positioned on the light-emitting element layer that includes the first light-emitting element EL1 and the second light-emitting element EL2 of each subpixel area BPA. The encapsulation layer 800 may prevent the light-emitting elements EL1 and EL2 from being damaged due to moisture and impact from the outside. The encapsulation layer 800 may have a multi-layered structure. For example, the encapsulation layer 800 may include a first encapsulation layer 810, a second encapsulation layer 820 and a third encapsulation layer 830, which are sequentially stacked, and the embodiments of the present disclosure are not limited thereto. The first encapsulation layer 810, the second encapsulation layer 820 and the third encapsulation layer 830 may include an insulating material. The second encapsulation layer 820 may include a material different from that of the first encapsulation layer 810 and the third encapsulation layer 830. For example, the first encapsulation layer 810 and the third encapsulation layer 830 may be inorganic encapsulation layers that include an inorganic insulating material, and the second encapsulation layer 820 may include an organic encapsulation layer that includes an organic insulating material. Therefore, the light-emitting elements EL1 and EL2 of the display apparatus may be more effectively prevented from being damaged due to moisture and impact from the outside.

A lens layer, which includes a first lens LZ1 and a second lens LZ2, may be disposed on the encapsulation layer 800 of each subpixel area BPA.

The first lens LZ1 may be disposed on the first light emission area BE1 of the first light-emitting element EL1 in the first lens area BWE so as not to limit the moving path of the light generated from the first light emission area BE1 in the left-right direction, thereby controlling the moving path of the light at a wide viewing angle. For example, the first lens LZ1 may not limit the moving path of the light emitted from the first light emission area BE1 of the first light-emitting element EL1 within a specific angle in the left-right direction to control the moving path at a wide viewing angle, and may limit the moving path of the light within a specific angle in the up and down direction to control the moving path at a narrow viewing angle.

The second lens LZ2 may be disposed on the second light emission area BE2 of the second light-emitting element EL2 in the second lens area BNE to limit the moving path of the light generated from the second light emission area BE2 in the left-right direction, thereby controlling the moving path of the light at a narrow viewing angle. For example, the second lens LZ2 may limit the moving path of the light emitted from the second light emission area BE2 of the second light-emitting element EL2 in the left-right direction to control the moving path of the light at a narrow viewing angle, and may limit the moving path of the light in the up and down direction to control the moving path at a narrow viewing angle.

A lens passivation layer 600 may be positioned on the first lens LZ1 and the second lens LZ2. The lens passivation layer 600 may include an organic insulating material. A refractive index of the lens passivation layer 600 may be smaller than a refractive index of the first lens LZ1 and a refractive index of the second lens LZ2. Therefore, light passing through the first lens LZ1 and the second lens LZ2 may not be reflected toward the substrate 101 due to a difference in refractive index from the lens passivation layer 600.

Figure 8:
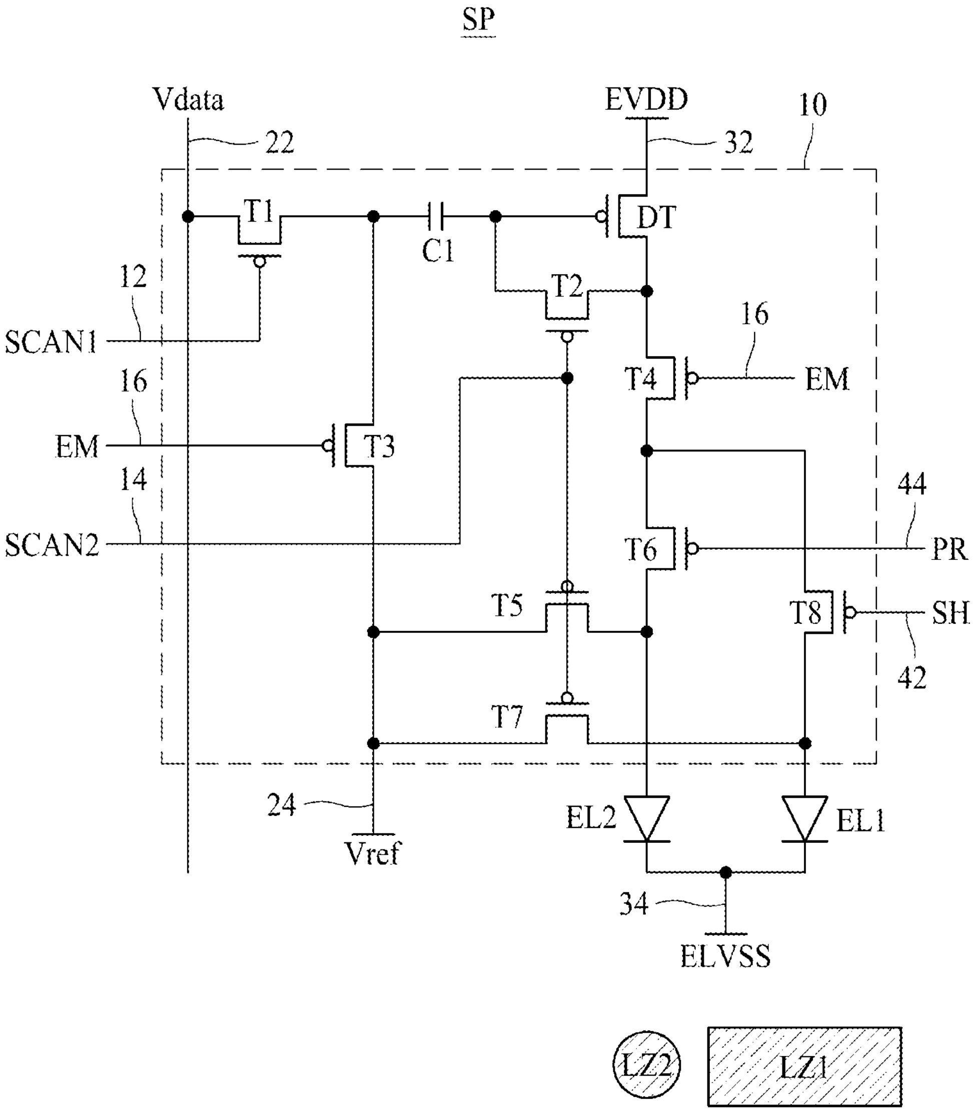
FIG. 8 is an equivalent circuit view illustrating a configuration of subpixels in a display panel according to one embodiment.
Figure 9:
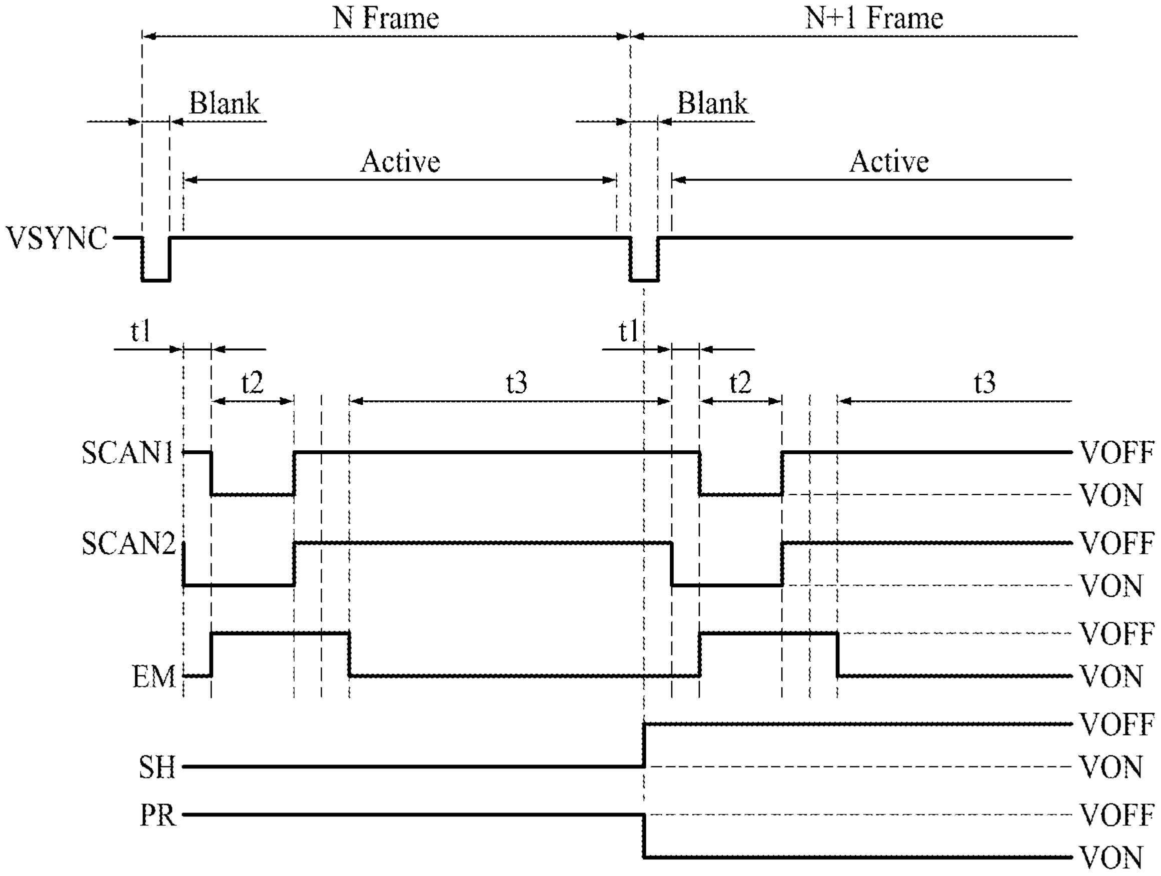
FIG. 9 is an exemplary view illustrating driving waveforms of subpixels in a display apparatus according to one embodiment.

FIG. 8 is an equivalent circuit view illustrating a configuration of each subpixel in a display panel according to one embodiment, and FIG. 9 is an exemplary view illustrating driving waveforms of subpixels in a display apparatus according to one embodiment.

Referring to FIG. 8, each subpixel SP includes a pixel circuit 10 including a plurality of transistors DT and T1 to T8 and first and second light-emitting elements EL1 and EL2, and first and second lenses LZ1 and LZ2 disposed on the first and second light-emitting elements EL1 and EL2, respectively.

The pixel circuit 10 of the subpixel SP shown in FIG. 8 may include eight switching transistors T1 to T8, a driving transistor DT, a storage capacitor C1, and first and second light-emitting elements EL1 and EL2, and is not limited to this configuration. In FIG. 8, the first mode control transistor T8 may correspond to the first mode control transistor ET1 shown in FIG. 6, and the second mode control transistor T6 may correspond to the second mode control transistor ET2 shown in FIG. 7.

Referring to FIGS. 8 and 9, the pixel circuit 10 of each subpixel SP may be driven so that each of frame periods N and N+1 includes an initialization period t1, a sampling and program period t2, and an emission period t3. Each of the frame periods N and N+1 may be distinguished by being synchronized with a vertical synchronization signal Vsync, and may include a blank period and an active period.

A first scan signal SCAN1 may be activated by a gate-on voltage VON during the sampling and program period t2, and may be deactivated by a gate-off voltage VOFF during the other periods.

A second scan signal SCAN2 may be activated by the gate-on voltage VON during the initialization period t1 and the sampling and program period t2, and may be deactivated by the gate-off voltage VOFF during the other periods.

The emission control signal EM may be activated by the gate-on voltage VON during the initialization period t1 and the emission period t3, and may be deactivated by the gate-off voltage VOFF during the other periods.

The first mode control signal SH may be activated by the gate-on voltage VON when the corresponding subpixel SP is controlled in a wide viewing angle mode or a share mode, and may be deactivated by the gate-off voltage VOFF when the corresponding subpixel SP is controlled in a narrow viewing angle mode or a privacy mode.

The second mode control signal PR may be activated by the gate-on voltage VON when the corresponding subpixel SP is controlled in a narrow viewing angle mode or a privacy mode, and may be deactivated by the gate-off voltage VOFF when the corresponding subpixel SP is controlled in a wide viewing angle mode or a share mode.

When the modes of the first and second mode control signals SH and PR are switched, voltage levels of the first and second mode control signals SH and PR may be reversed at the blank period between the (N)th (N is a natural number) frame period and the (N+1)th frame period, which are distinguished by the vertical synchronization signal VSYNC.

In each subpixel SP, the first light-emitting element EL1 may be driven by the first mode control transistor T8 controlled by the first mode control signal SH, and the second light-emitting element EL2 may be driven by the second mode control transistor T6 controlled by the second mode control signal PR. The first lens LZ1 disposed in a light moving direction of the first light-emitting element EL1 may control the viewing angle in the left-right direction at the wide viewing angle. The second lens LZ2 disposed in a light moving direction of the second light-emitting element EL2 may control the viewing angle in the left-right direction at the narrow viewing angle.

Each of the transistors DT and T1 to T8 of each subpixel SP includes a gate electrode, a source electrode and a drain electrode. Since the source electrode and the drain electrode may be changed depending on a voltage applied to the gate electrode and a current direction without being fixed, any one of the source electrode and the drain electrode may be expressed as a first electrode, and the other one may be expressed as a second electrode. The transistors DT and T1 to T8 of each subpixel SP may use at least one of a polysilicon semiconductor, an amorphous silicon semiconductor or an oxide semiconductor. The transistors may be P-type or N-type transistors, or P-type and N-type transistors may be used interchangeably.

Each of the light-emitting elements EL1 and EL2 may include an anode electrode connected to the mode control transistor T8 or T6, a cathode electrode supplied with a second power voltage EVSS from the second power line 34, and a light-emitting layer between the anode electrode and the cathode electrode. The anode electrode is an independent electrode for each light-emitting element, but the cathode electrode may be a common electrode shared by the entire light-emitting elements. When a driving current is supplied from the driving transistor DT through the mode control transistor T8 and T6, electrons from the cathode electrode may be injected into the light-emitting layer and holes from the anode electrode may be injected into the light-emitting layer (such as an organic light-emitting layer) so that fluorescent or phosphorescent materials may emit light through recombination of the electrons and the holes in the light-emitting layer, thereby generating light of brightness proportional to a current value of the driving current.

The first electrode of the driving transistor DT may be connected to the first power line 32 for supplying the first power voltage EVDD. The first power voltage EVDD may be supplied from the power management circuit 700. The second electrode of the driving transistor DT may be commonly connected to the first electrodes of the first and second mode control transistors T8 and T6 through the fourth switching transistor T4. The driving transistor DT may drive the first light-emitting element EL1 through the first mode control transistor T8, or may drive the second light-emitting element EL2 through the fourth switching transistor T4 and the second mode control transistor T6. The driving transistor DT may control the emission intensity of the first light-emitting element EL1 or the second light-emitting element EL2 through the first mode control transistor T8 or the second mode control transistor T6 by controlling a driving current Ids in accordance with a driving voltage Vgs of the storage capacitor C1.

The storage capacitor C1 may be connected between the gate electrode of the driving transistor DT and a second electrode of the first switching transistor T1, and charged with the driving voltage Vgs corresponding to the data voltage Vdata. The storage capacitor C1 may hold the charged driving voltage Vgs during the emission period t3 at which the first switching transistor T1 is turned off, thereby supplying the driving voltage to the driving transistor DT.

The first switching transistor T1 may be turned on or off in response to the first scan signal SCAN1 supplied to a first gate line 12 disposed in an (N)th (N is a natural number) pixel row line. The first switching transistor T1 may supply the data voltage Vdata supplied through the data line 22 to the first electrode of the storage capacitor C1 in response to the gate-on voltage VON of the first scan signal SCAN1 during the sampling and program period t2. The first scan signal SCAN1 may be supplied from the scan driver (210 in FIG. 1).

The second, fifth and seventh switching transistors T2, T5 and T7 may be turned on or off in response to the second scan signal SCAN2 supplied to a second gate line 14 disposed in the (N)th pixel row line. The second scan signal SCAN2 may be supplied from the scan driver (210 in FIG. 1).

The second switching transistor T2 may connect the gate electrode with the second electrode (or drain electrode) of the driving transistor DT in response to the gate-on voltage VON of the second scan signal SCAN2 during the initialization period t1 and the sampling and program period t2, thereby connecting the driving transistor DT to a diode structure. The second switching transistor T2 may charge a threshold voltage Vth of the driving transistor DT in the storage capacitor C1 and compensate for the threshold voltage Vth. Therefore, the storage capacitor C1 may be charged with the data voltage Vdata+Vth, for which the threshold voltage Vth of the driving transistor DT is compensated, during the sampling and program period t2.

The fifth switching transistor T5 may supply the initialization voltage VREF (or the reference voltage) supplied through the initialization voltage line 24 to the anode electrode of the second light-emitting element EL2 in response to the gate-on voltage VON of the second scan signal SCAN2 during the initialization period t1 and the sampling and program period t2.

The seventh switching transistor T7 may supply the initialization voltage VREF (or the reference voltage) supplied through the initialization voltage line 24 to the anode electrode of the first light-emitting element EL1 in response to the gate-on voltage VON of the second scan signal SCAN2 during the initialization period t1 and the sampling and program period t2.

The third and fourth switching transistors T3 and T4 may be turned on or off in response to the emission control signal EM supplied to a third gate line 16 disposed in the (N)th pixel row line. The emission control signal EM may be supplied from the emission control driver (220 in FIG. 1).

The third switching transistor T3 may supply the initialization voltage VREF (or the reference voltage) supplied through the initialization voltage line 24 to the first electrode of the storage capacitor C1 in response to the gate-on voltage VON of the emission control signal EM during the initialization period t1 and the emission period t3.

The fourth switching transistor T4 may connect the driving transistor DT with the first and second mode control transistors T8 and T6 in response to the gate-on voltage VON of the emission control signal EM during the initialization period t1 and the emission period t3.

The first mode control transistor T8 may be turned on or off by being controlled by the first mode control signal SH supplied to a first mode control line 42, and the second mode control transistor T6 may be turned on or off by being controlled by the second mode control signal PR supplied to the second mode control line 44.

In the wide viewing angle mode or the share mode in which the first mode control signal SH is activated by the gate-on voltage VON, the first mode control transistor T8 may connect the driving transistor DT with the first light-emitting element EL1 during the emission period t3 at which the fourth switching transistor T4 is turned on by the emission control signal EM. Therefore, the first light-emitting element EL1 may be driven by the driving current from the driving transistor DT to emit light, whereby the subpixel SP may emit light at a wide viewing angle through the first lens LZ1.

In the narrow viewing angle mode or the privacy mode in which the second mode control signal PR is activated by the gate-on voltage VON, the second mode control transistor T6 may connect the driving transistor DT with the second light-emitting element EL2 during the emission period t3 at which the fourth switching transistor T4 is turned on by the emission control signal EM. Therefore, the second light-emitting element EL2 may be driven by the driving current from the driving transistor DT to emit light, whereby the subpixel SP may emit light at a narrow viewing angle through the second lens LZ2.

Figure 10:
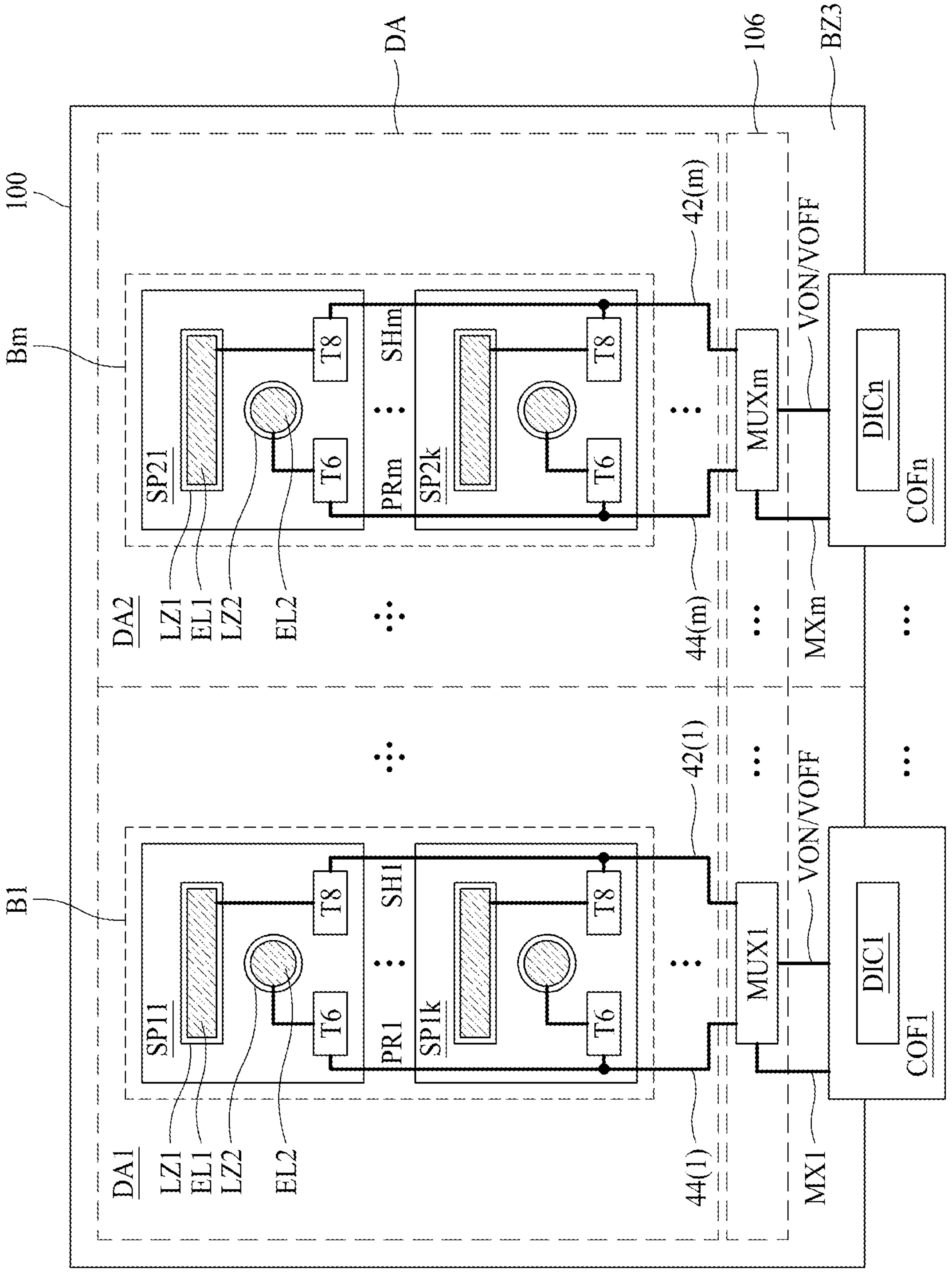
FIG. 10 is a schematic view illustrating a configuration of a display apparatus according to one embodiment.
Figure 11:
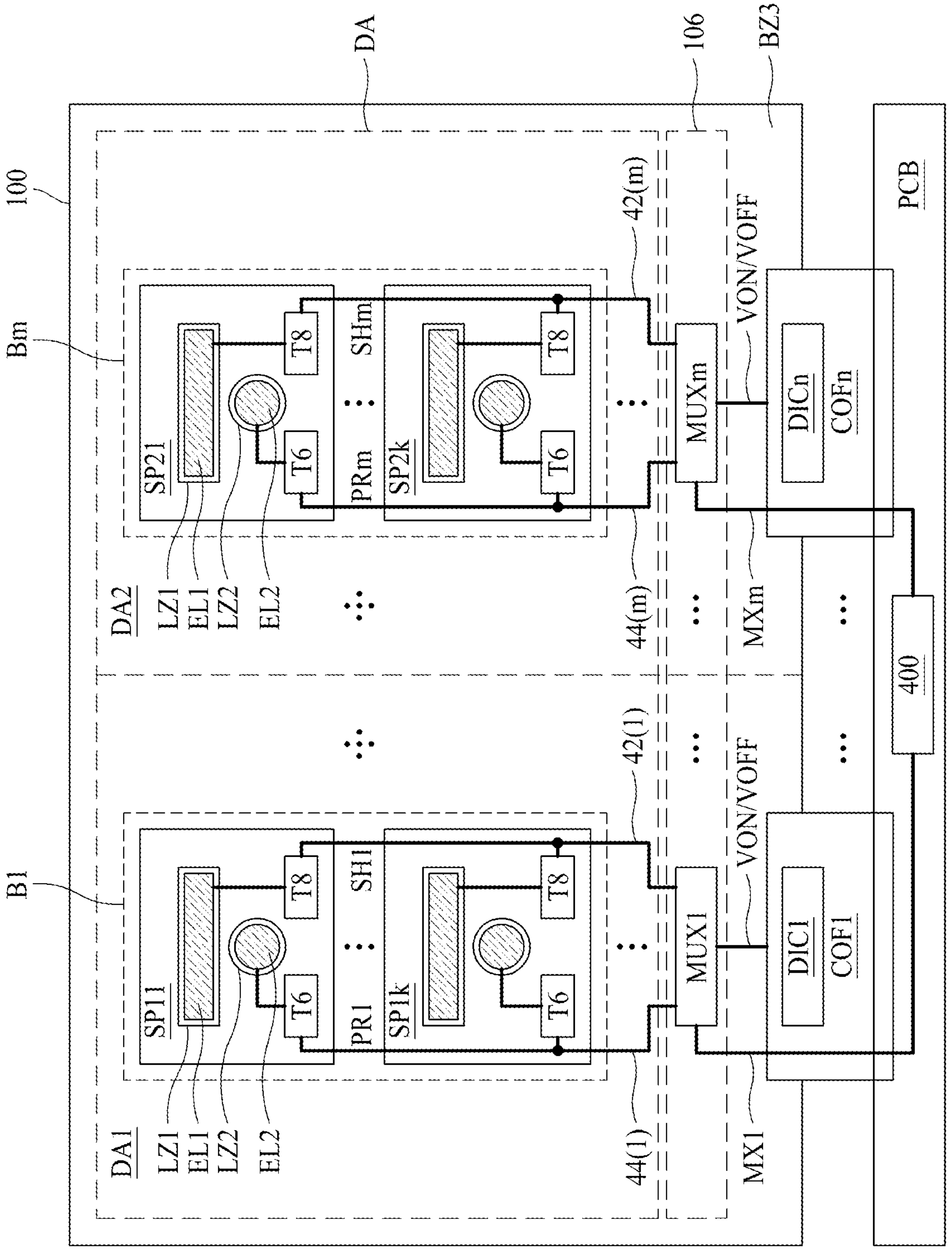
FIG. 11 is a schematic view illustrating a configuration of a display apparatus according to one embodiment.
Figure 12:
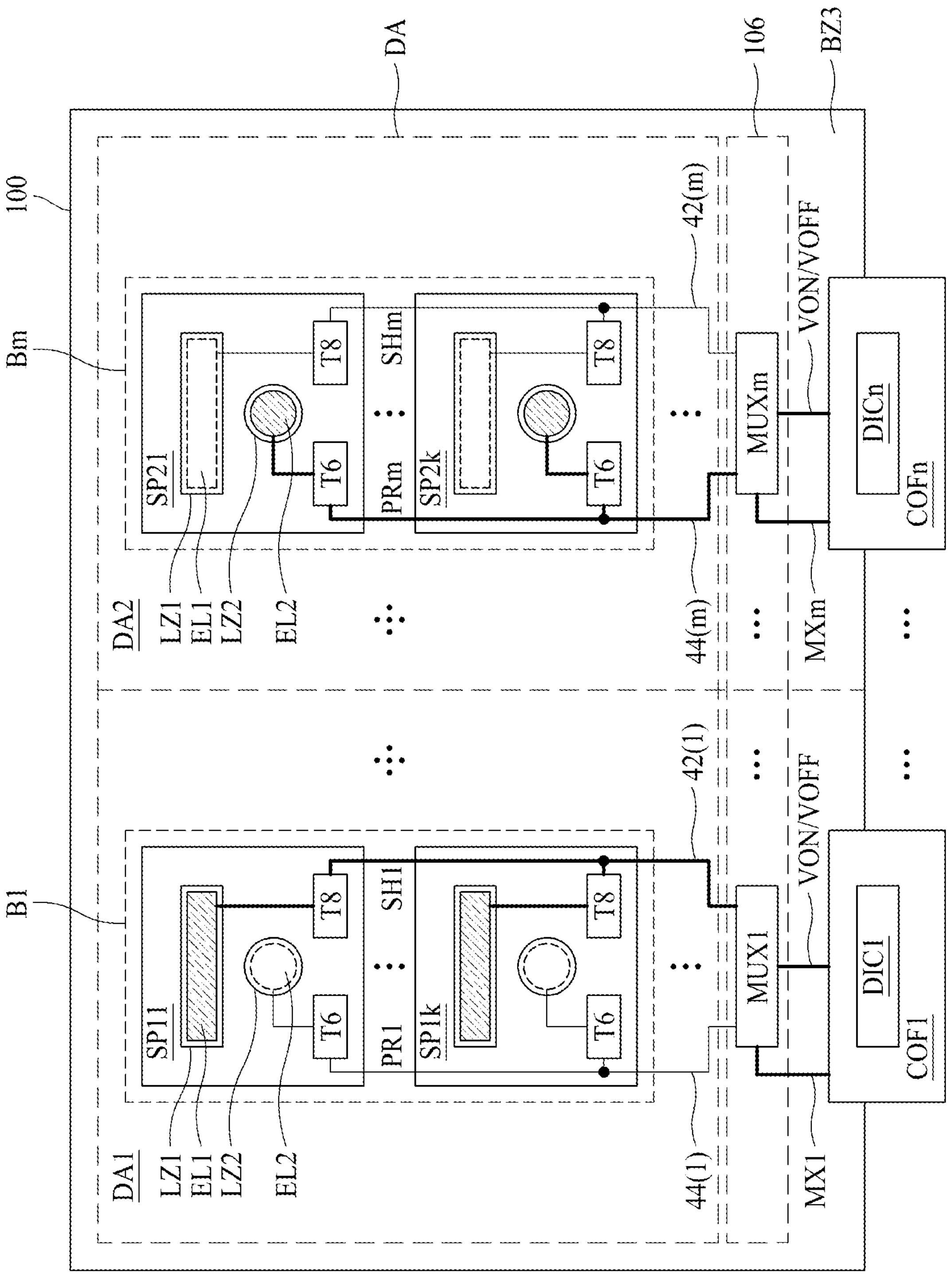
FIG. 12 is an exemplary view illustrating a method for driving a display apparatus according to one embodiment.
Figure 13:
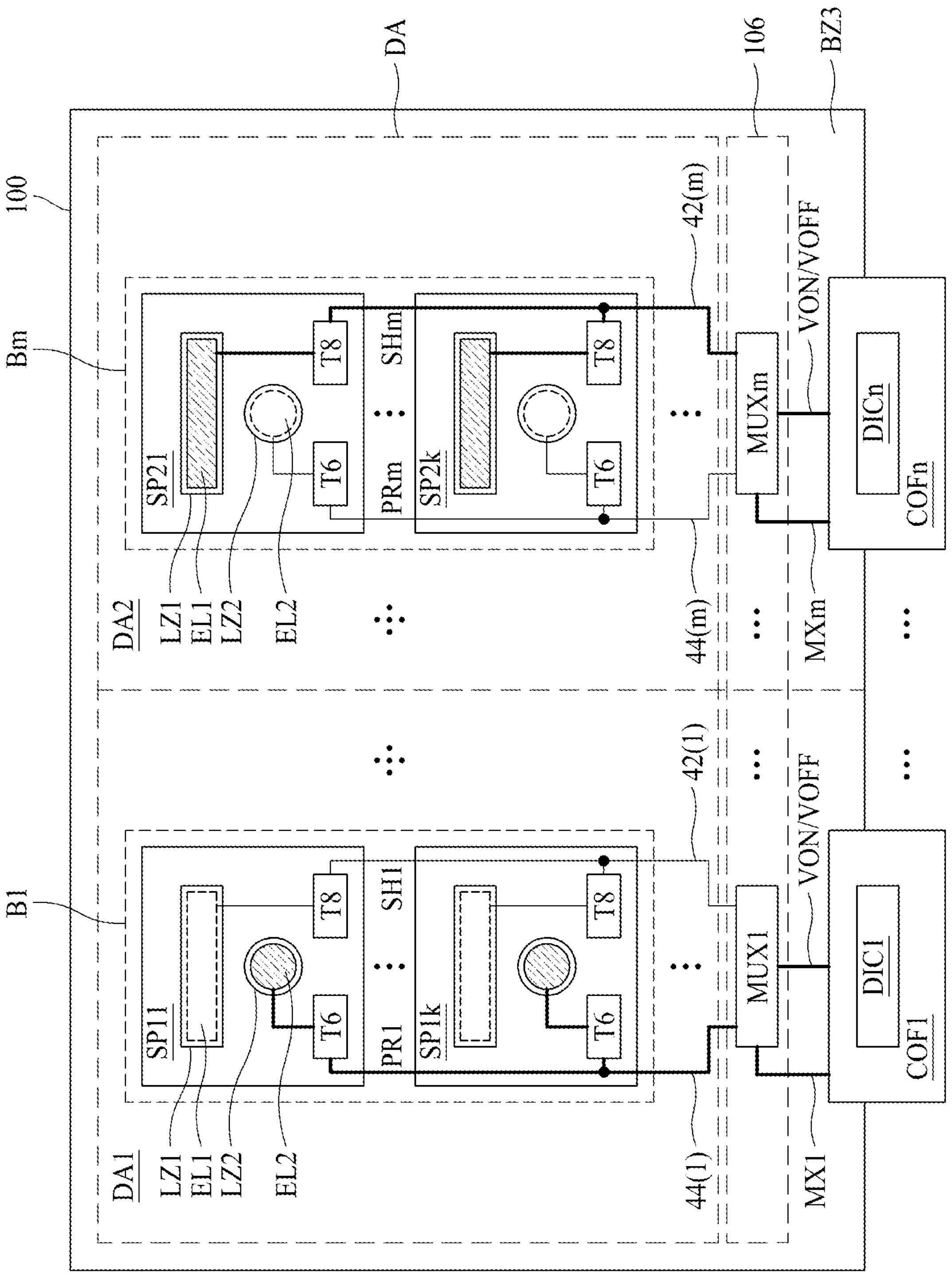
FIG. 13 is an exemplary view illustrating a method for driving a display apparatus according to one embodiment.

FIGS. 10 and 11 are schematic views illustrating a configuration of a display apparatus according to one embodiment, and FIGS. 12 and 13 are exemplary views illustrating a method for driving a display apparatus according to one embodiment.

Referring to FIGS. 10 and 11, in the display apparatus according to one embodiment, the display panel 100 may be connected to a plurality of circuit films COF1 to COFn on which a plurality of data drive ICs DIC1 to DICn (n is a natural number greater than or equal to 2) are respectively packaged. The plurality of circuit films COF1 to COFn may be bonded to a pad area provided in a bezel area BZ3 of the display panel 100. The plurality of circuit films COF1 to COFn may be connected to a printed circuit board (PCB) on which the timing controller 400 is packaged. The plurality of circuit films COF1 to COFn may be bonded to a pad area provided in the printed circuit board (PCB).

The display area DA of the display panel 100 may include a plurality of pixel blocks B1 to Bm (m is a natural number greater than or equal to 2) capable of independently controlling a viewing angle.

The plurality of pixel blocks B1 to Bm may be individually controlled by a plurality of multiplexer circuits MUX1 to MUXm and thus selectively controlled in a wide viewing angle mode (share mode) or a narrow viewing angle mode (privacy mode).

Each of the plurality of pixel blocks B1 to Bm may include a plurality of subpixels SP11 to SP1*k* or SP21 to SP2*k*. Each subpixel SP may include a first light-emitting element EL1 in which light emission is controlled through the first mode control transistor T8 of the pixel circuit, a second light-emitting element EL2 in which light emission is controlled through the second mode control transistor T6, a first lens LZ1 disposed on the first light-emitting element EL1, and a second lens LZ2 disposed on the second light-emitting element EL2.

The first mode control transistor T8 may be controlled by a first mode control signal SHi supplied from a multiplexer circuit MUXi (i=1 to m) through a first mode control line 42(i) (i=1 to m), and the second mode control transistor T6 may be controlled by a second mode control signal PRi supplied through a second mode control line 44(i) (i=1 to m).

The plurality of multiplexer circuits MUX1 to MUXm may be disposed in a multiplexer circuit area 106 provided between a pad area, to which the circuit films COF1 to COFn are bonded in the bezel area BZ3 of the display panel 100, and the display areas DA. In one embodiment, the multiplexer circuit area 106 may include a demultiplexer circuit for distributing data signals output from the data drive ICs DIC1 to DICn to data lines of the display area DA.

Each of the plurality of multiplexer circuits MUX1 to MUXm may supply any one of the gate-on voltage VON and the gate-off voltage VOFF to each of the plurality of pixel blocks B1 to Bm through the first mode control line 42(i) (i=1 to m) as the first mode control signal SHi (i=1 to m) in response to a control signal MXi (i=1 to m), or may supply any one of the gate-on voltage VON and the gate-off voltage VOFF through the second mode control line 44(i) (i=1 to m) as the second mode control signal PRi (i=1 to m).

In one embodiment, when the transistors included in the multiplexer circuits MUX1 to MUXm are the p-type transistors, the gate-on voltage VON may be expressed as a gate low voltage VGL, and the gate-off voltage VOFF may be expressed as a gate high voltage VGH.

In one embodiment, when the transistors included in the multiplexer circuits MUX1 to MUXm are the n-type transistors, the gate-on voltage VON may be expressed as the gate high voltage VGH, and the gate-off voltage VOFF may be expressed as the gate low voltage VGL.

The gate-on voltage VON and the gate-off voltage VOFF may be supplied from the power management circuit (700 of FIG. 1). The power management circuit (700 of FIG. 1) may be packaged on the printed circuit board (PCB) together with the timing controller 400.

In one embodiment, the plurality of control signals MX1 to MXm for respectively controlling the plurality of multiplexer circuits MUX1 to MUXm may be supplied from at least one of the data drive ICs DIC1 to DICn through at least one of the circuit films COF1 to COFn.

In one embodiment, the plurality of control signals MX1 to MXm for respectively controlling the plurality of multiplexer circuits MUX1 to MUXm may be supplied from the timing controller 400 via the printed circuit board PCB and the circuit films COF1 to COFn as shown in FIG. 11.

The plurality of multiplexer circuits MUX1 to MUXm may selectively output the gate-on voltage VON and the gate-off voltage VOFF as the first mode control signal SHi (i=1 to m) and the second mode control signal PRi (i=1 to m) by individually responding to the plurality of control signals MX1 to MXm. Therefore, each of the plurality of multiplexer circuits MUX1 to MUXm may independently control a viewing angle of each of the plurality of pixel blocks B1 to Bm.

The first multiplexer circuit MUX1 may output the gate-on voltage VON as one of the first mode control signal SH1 and the second mode control signal PR1 and output the gate-off voltage VOFF as the other one of the first mode control signal SH1 and the second mode control signal PR1, in response to the first control signal MX1 , thereby controlling a viewing angle mode of the first pixel block B1.

The (m)th multiplexer circuit MUXm may output the gate-on voltage VON as one of the first mode control signal SHm and the second mode control signal PRm and output the gate-off voltage VOFF as the other one of the first mode control signal and the second mode control signal, in response to an (m)th control signal, thereby controlling a viewing angle mode of the (m)th pixel block Bm.

For example, as shown in FIG. 12, the first multiplexer circuit MUX1 may output the gate-on voltage VON as the first mode control signal SH1, and may output the gate-off voltage VOFF as the second mode control signal PR1, in response to the first control signal MX1 indicating a wide viewing angle mode. Therefore, the first light-emitting element EL1 may emit light through the first mode control transistor T8 in response to the first mode control signal SH1 activated by the gate-on voltage VON in the subpixels SP11 to SP1*k* included in the first pixel block B1, thereby emitting light at a wide viewing angle through the first lens LZ1.

The (m)th multiplexer circuit MUXm may output the gate-on voltage VON as the second mode control signal PRm, and may output the gate-off voltage VOFF as the first mode control signal SHm, in response to the (m)th control signal MXm indicating a narrow viewing angle mode. Therefore, the second light-emitting element EL2 may emit light through the second mode control transistor T6 in response to the second mode control signal PRm activated by the gate-on voltage VON in the subpixels SP21 to SP2*k* included in the (m)th pixel block Bm, thereby emitting light at a narrow viewing angle through the second lens LZ2.

Therefore, the first display area DA1 including the first pixel block B1 may display an image in a wide viewing angle mode, and the second display area DA2 including an (m)th pixel block Bm may display an image in a narrow viewing angle mode.

Referring to FIG. 13, the first multiplexer circuit MUX1 may output the gate-on voltage VON as the second mode control signal PR1, and may output the gate-off voltage VOFF as the first mode control signal SH1, in response to the first control signal MX1 indicating a narrow viewing angle mode. Therefore, the second light-emitting element EL2 may emit light through the second mode control transistor T6 in response to the second mode control signal PR1 activated by the gate-on voltage VON in the subpixels SP11 to SP1*k* included in the first pixel block B1, thereby emitting light at a narrow viewing angle through the second lens LZ2.

The (m)th multiplexer circuit MUXm may output the gate-on voltage VON as the first mode control signal SHm-, and may output the gate-off voltage VOFF as the second mode control signal PRm, in response to the (m) th control signal MXm indicating a wide viewing angle mode. Therefore, the first light-emitting element EL1 may emit light through the first mode control transistor T8 in response to the first mode control signal SHm activated by the gate-on voltage VON in the subpixels SP21 to SP2*k* included in the (m) th pixel block Bm, thereby emitting light at a wide viewing angle through the first lens LZ1.

Therefore, the first display area DA1 including the first pixel block B1 may provide an image of a narrow viewing angle, and the second display area DA2 including an (m)th pixel block Bm may provide an image of a wide viewing angle.

Figure 14:
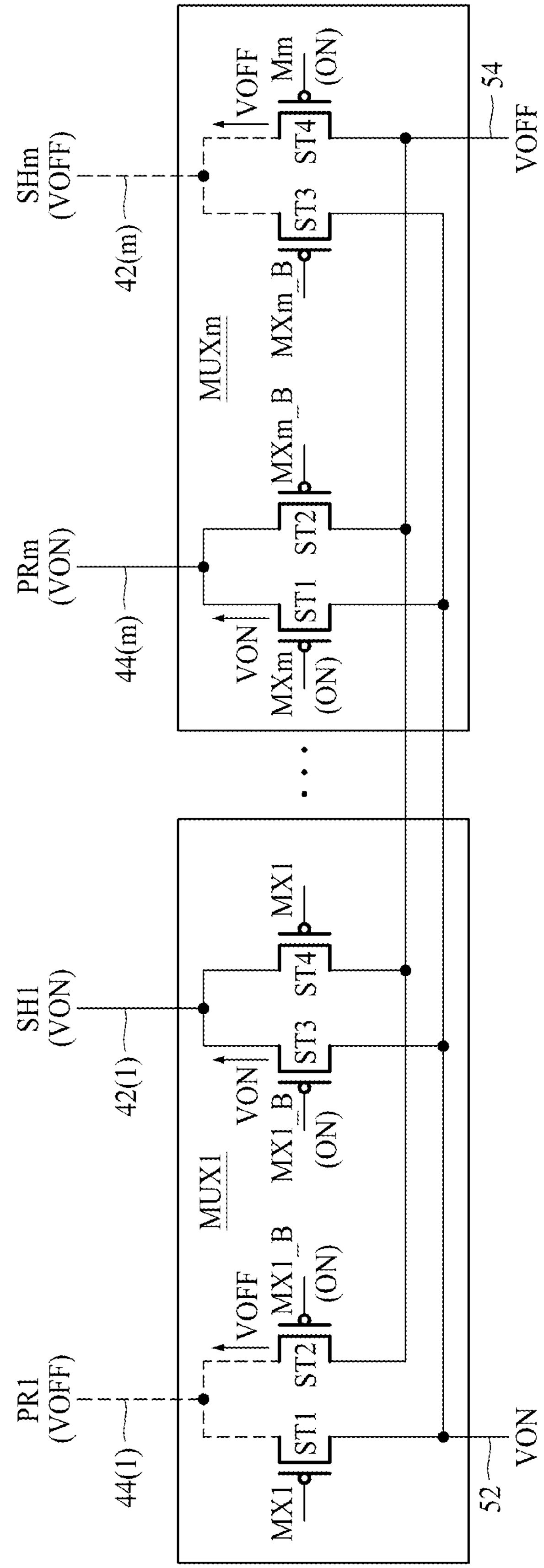
FIG. 14 is an exemplary view illustrating a method for driving a multiplexer circuit in a display apparatus according to one embodiment.
Figure 15:
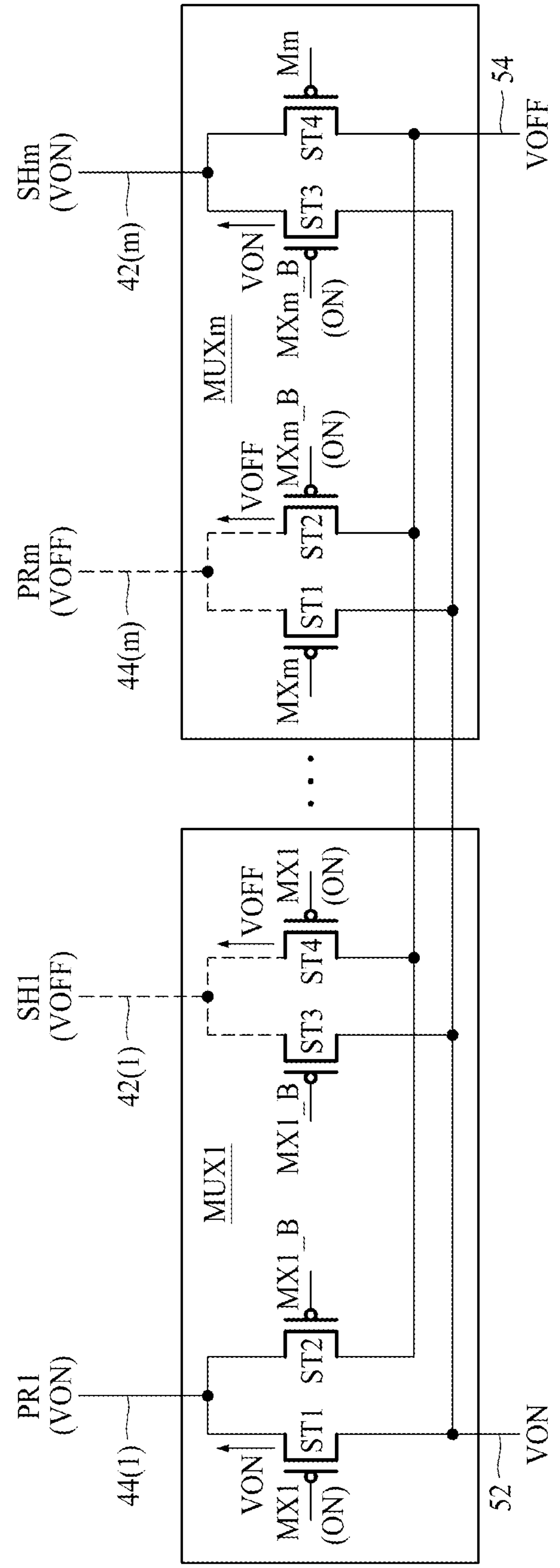
FIG. 15 is an exemplary view illustrating a method for driving a multiplexer circuit in a display apparatus according to one embodiment.
Figure 16:
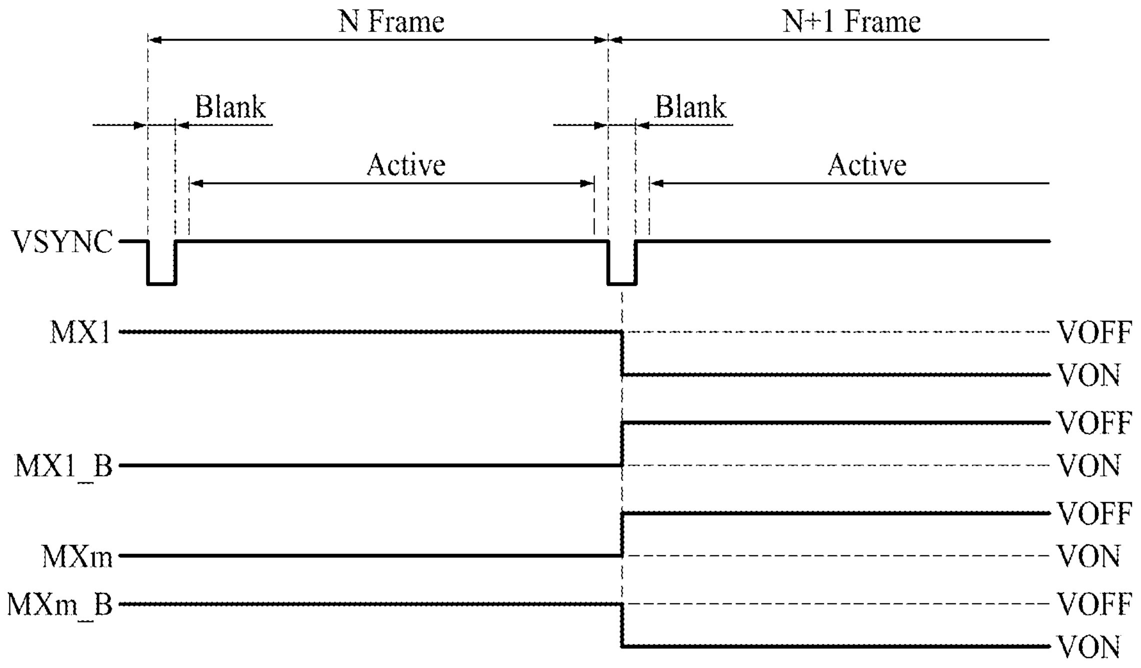
FIG. 16 is an exemplary view illustrating driving waveforms of a multiplexer circuit in a display apparatus according to one embodiment.

FIGS. 14 and 15 are views illustrating a method for driving a multiplexer circuit in a display apparatus according to one embodiment, and FIG. 16 is a view illustrating a method for driving a multiplexer circuit in a display apparatus according to one embodiment.

Referring to FIGS. 14 and 15, each of the plurality of multiplexer circuits MUX1 to MUXm may include a plurality of switching elements ST1, ST2, ST3 and ST4 that selectively output the gate-on voltage VON and the gate-off voltage VOFF in response to each of the plurality of control signals MX1 to MXm and a plurality of inverted control signals MX1_B to MXm_B.

In each of the plurality of multiplexer circuits MUX1 to MUXm, the first switching element ST1 may be switched by a control signal MXi (i=1 to m) to output the gate-on voltage VON as the second mode control signal PRi (i=1 to m).

The second switching element ST2 may be switched by an inverted control signal MXi_B (i=1 to m) opposite to the control signal MXi (i=1 to m) to output the gate-off voltage VOFF as the second mode control signal PRi (i=1 to m).

The third switching element ST3 may be switched by the inverted control signal MXi_B (i=1 to m) to output the gate-on voltage VON as the first mode control signal SHi (i=1 to m).

The fourth switching element ST4 may be switched by the control signal MXi (i=1 to m) to output the gate-off voltage VOFF as the first mode control signal SHi (i=1 to m).

For example, referring to FIGS. 14 and 16, at the (N)th frame period, the first multiplexer circuit MUX1 may be supplied with the first control signal MX1 of the gate-off voltage VOFF indicating a wide viewing angle mode and the first inverted control signal MX1_B of the gate-on voltage VON. The (m)th multiplexer circuit MUXm may be supplied with the (m)th control signal MXm of the gate-on voltage VON indicating a narrow viewing angle mode and the (m)th inverted control signal of the gate-off voltage VOFF.

In the multiplexer circuit MUX1, the third switching element ST3 may be turned on by the first inverted control signal MX1_B of the gate-on voltage VON to output the gate-on voltage VON as the first mode control signal SH1. The second switching element ST2 may be turned on by the first inverted control signal MX1_B of the gate-on voltage VON to output the gate-off voltage VOFF as the second mode control signal PR1.

In the (m)th multiplexer circuit MUXm, the first switching element ST1 may be turned on by the (m)th control signal MXm of the gate-on voltage VON to output the gate-on voltage VON as the second mode control signal PRm. The fourth switching element ST4 may be turned on by the (m)th control signal MXm of the gate-on voltage VON to output the gate-off voltage VOFF as the first mode control signal SHm.

Therefore, as shown in FIG. 12, in the subpixels SP11 to SP1*k* of the first pixel block B1, the first light-emitting element EL1 may emit light in response to the first mode control signal SH1 of the gate-on voltage VON to emit light at a wide viewing angle through the first lens LZ1. In the subpixels SP21 to SP2*k* of the (m)th pixel block Bm, the second light-emitting element EL2 may emit light in response to the second mode control signal PRm of the gate-on voltage VON to emit light at a narrow viewing angle through the second lens LZ2. Therefore, the first display area DA1 including the first pixel block B1 may display an image in a wide viewing angle mode, and the second display area DA2 including the (m)th pixel block Bm may display an image in a narrow viewing angle mode.

Referring to FIGS. 15 and 16, at the (N+1)th frame period, the first multiplexer circuit MUX1 may be supplied with the first control signal MX1 of the gate-on voltage VON and the first inverted control signal MX1_B of the gate-off voltage VOFF, which indicate a narrow viewing angle mode, and the (m)th multiplexer circuit MUXm may be supplied with the (m)th control signal MXm of the gate-off voltage VOFF and the (m)th inverted control signal of the gate-on voltage VON, which indicate a wide viewing angle mode.

In the multiplexer circuit MUX1, the first switching element ST1 may be turned on by the first control signal MX1 of the gate-on voltage VON to output the gate-on voltage VON as the second mode control signal PR1. The fourth switching element ST4 may be turned on by the first inverted control signal MX1_B of the gate-on voltage VON to output the gate-off voltage VOFF as the first mode control signal SH1.

In the (m)th multiplexer circuit MUXm, the third switching element ST3 may be turned on by the (m)th inverted control signal MXm_B of the gate-on voltage VON to output the gate-on voltage VON as the first mode control signal SHm. The second switching element ST2 may be turned on by the (m)th inverted control signal of the gate-on voltage VON to output the gate-off voltage VOFF as the second mode control signal PRm.

Therefore, as shown in FIG. 13, in the subpixels SP11 to SP1*k* of the first pixel block B1, the second light-emitting element EL2 may emit light in response to the second mode control signal PR1 of the gate-on voltage VON, thereby emitting the light at a narrow viewing angle through the second lens LZ2. In the subpixels SP21 to SP2*k* of the (m)th pixel block Bm, the first light-emitting element EL1 may emit light in response to the first mode control signal SHm of the gate-on voltage VON, thereby emitting the light at a wide viewing angle through the first lens LZ1. Therefore, the first display area DA1 including the first pixel block B1 may display an image in a narrow viewing angle mode, and the second display area DA2 including the (m)th pixel block Bm may display an image in a wide viewing angle mode.

As described above, according to the present disclosure, the following advantageous effects may be obtained.

In the display panel and the display apparatus according to some embodiments, the first light-emitting element corresponding to the first lens area and the second light-emitting element corresponding to the second lens area in each subpixel may be selectively driven using a control circuit (such as the multiplexer circuit) for outputting the first and second mode control signals, for example, selectively, so that the viewing angle of each of the plurality of areas in the display area may be controlled at the wide viewing angle or the narrow viewing angle.

In the display panel and the display apparatus according to some embodiments, since the plurality of areas may be respectively controlled at the wide viewing angle or the narrow viewing angle by using a control circuit (such as the multiplexer circuit) for outputting first and second mode control signals, for example, selectively, the ratios (sizes) of the wide viewing angle area and the narrow viewing angle area as well as the positions of the wide viewing angle area and the narrow viewing angle area may be freely adjusted in the first direction and the second direction without manufacture of a new display panel.

In the display panel and the display apparatus according to some embodiments, since the ratios (sizes) of the wide viewing angle area and the narrow viewing angle area as well as the positions of the wide viewing angle area and the narrow viewing angle area may be freely adjusted in the first direction and the second direction, for example, in accordance with a user request or contents without manufacture of a new display panel, the manufacturing costs may be reduced and user's convenience and satisfaction may be improved.

A display panel according to some aspects may include a plurality of pixel blocks including a plurality of subpixels disposed in a display area; and a plurality of multiplexer circuits disposed in a bezel area outside the display area and individually connected to the plurality of pixel blocks, wherein each of the plurality of multiplexer circuits may supply a first mode control signal and a second mode control signal to a corresponding one of the plurality of pixel blocks. Each of the plurality of subpixels may include a first light-emitting element connected to a driving transistor through a first mode control transistor controlled by the first mode control signal, a second light-emitting element connected to the driving transistor through a second mode control transistor controlled by the second mode control signal, a first lens area disposed on the first light-emitting element, and a second lens area disposed on the second light-emitting element.

In the display panel according to some aspects, each subpixel controls a viewing angle in a first direction at a wide viewing angle through the first lens area as the first light-emitting element may be driven when the first mode control signal is activated, and may control the viewing angle in the first direction at a narrow viewing angle narrower than the wide viewing angle through the second lens area as the second light-emitting element is driven when the second mode control signal is activated.

In the display panel according to some aspects, each of the plurality of multiplexer circuits may selectively output a gate-on voltage and a gate-off voltage as the first and second mode control signals in response to a control signal.

In the display panel according to some aspects, each of the plurality of multiplexer circuits may output a gate-on voltage as the first mode control signal and outputs a gate-off voltage as the second mode control signal in response to a control signal indicating a wide viewing angle mode.

In the display panel according to some aspects, each of the plurality of multiplexer circuits may output a gate-on voltage as the second mode control signal and outputs a gate-off voltage as the first mode control signal in response to a control signal indicating a narrow viewing angle mode.

In the display panel according to some aspects, each of the plurality of multiplexer circuits may include a first switching element outputting a gate-on voltage as the second mode control signal in response to a control signal, a second switching element outputting a gate-off voltage as the second mode control signal in response to an inverted control signal opposite to the control signal, a third switching element outputting the gate-on voltage as the first mode control signal in response to the inverted control signal, and a fourth switching element outputting the gate-off voltage as the first mode control signal in response to the control signal.

In the display panel according to some aspects, each subpixel may further include a storage capacitor connected to a gate electrode of the driving transistor, a first switching transistor supplying a data voltage of a data line to a first electrode of the storage capacitor in response to a first scan signal of a first gate line, a second switching transistor connecting the driving transistor to a diode structure in response to a second scan signal of a second gate line, a third switching transistor supplying an initialization voltage of an initialization voltage line to the first electrode of the storage capacitor in response to an emission control signal of a third gate line, a fourth switching transistor connecting the driving transistor with the first and second mode control transistors in response to the emission control signal of the third gate line, a fifth switching transistor supplying the initialization voltage of the initialization voltage line to an anode electrode of the second light-emitting element in response to the second scan signal of the second gate line, and a seventh switching transistor supplying the initialization voltage of the initialization voltage line to an anode electrode of the first light-emitting element in response to the second scan signal of the second gate line.

In the display panel according to some aspects, the first light-emitting element may include a first light emission area, and the first lens overlaps the first light emission area, may have a bottom surface wider than the first light emission area, controls a viewing angle in a first direction at a wide viewing angle, and controls a viewing angle in a second direction at a narrow viewing angle.

In the display panel according to some aspects, the second light-emitting element may include a plurality of second light emission areas, the second lens area may include a plurality of second lenses that overlap the plurality of second light emission areas, respectively, and each of the plurality of second lenses may have a bottom surface wider than each of the plurality of second light emission areas and controls a viewing angle in the first and second directions at a narrow viewing angle.

In the display panel according to some aspects, the plurality of subpixels may include a first colored subpixel, a second colored subpixel and a third colored subpixel, a size of the first lens may be different for each of the first, second and third colored subpixels, and the number of second lenses may be different for each of the first, second and third colored subpixels.

A display apparatus according to some aspects may include a display panel including a plurality of pixel blocks including a plurality of subpixels disposed in a display area and a plurality of multiplexer circuits disposed in a bezel area outside the display area, supplying first and second mode control signals to each of the plurality of pixel blocks, and a data driver disposed in the bezel area, driving data lines disposed in the display area, wherein each of the multiplexer circuits may activate one of the first mode control signal and the second mode control signal in response to a control signal. Each of the plurality of subpixels may include a first light-emitting element connected to a driving transistor through a first mode control transistor controlled by the first mode control signal, a second light-emitting element connected to the driving transistor through a second mode control transistor controlled by the second mode control signal, a first lens area disposed on the first light-emitting element, and a second lens area disposed on the second light-emitting element.

In the display apparatus according to some aspects, each subpixel may control a viewing angle in a first direction at a wide viewing angle through the first lens area as the first light-emitting element is driven when the first mode control signal is activated, and may control the viewing angle in the first direction at a narrow viewing angle narrower than the wide viewing angle through the second lens area as the second light-emitting element is driven when the second mode control signal is activated.

In the display apparatus according to some aspects, each of the plurality of multiplexer circuits may be supplied with the control signal from any one of the data driver and a timing controller for controlling the data driver.

In the display apparatus according to some aspects, each of the plurality of multiplexer circuits may selectively output a gate-on voltage and a gate-off voltage as the first and second mode control signals in response to the control signal.

In the display apparatus according to some aspects, each of the plurality of multiplexer circuits may output a gate-on voltage as the first mode control signal and may output a gate-off voltage as the second mode control signal in response to the control signal indicating a wide viewing angle mode.

In the display apparatus according to some aspects, each of the plurality of multiplexer circuits may output a gate-on voltage as the second mode control signal and may output a gate-off voltage as the first mode control signal in response to the control signal indicating a narrow viewing angle mode.

In the display apparatus according to some aspects, each of the plurality of multiplexer circuits may include a first switching element outputting a gate-on voltage as the second mode control signal in response to the control signal, a second switching element outputting a gate-off voltage as the second mode control signal in response to an inverted control signal opposite to the control signal, a third switching element outputting the gate-on voltage as the first mode control signal in response to the inverted control signal, and a fourth switching element outputting the gate-off voltage as the first mode control signal in response to the control signal.

In the display apparatus according to some aspects, each subpixel may further include a storage capacitor connected to a gate electrode of the driving transistor, a first switching transistor supplying a data voltage of a data line to a first electrode of the storage capacitor in response to a first scan signal of a first gate line, a second switching transistor connecting the driving transistor to a diode structure in response to a second scan signal of a second gate line, a third switching transistor supplying an initialization voltage of an initialization voltage line to the first electrode of the storage capacitor in response to an emission control signal of a third gate line, a fourth switching transistor connecting the driving transistor with the first and second mode control transistors in response to the emission control signal of the third gate line, a fifth switching transistor supplying the initialization voltage of the initialization voltage line to an anode electrode of the second light-emitting element in response to the second scan signal of the second gate line, and a seventh switching transistor supplying the initialization voltage of the initialization voltage line to an anode electrode of the first light-emitting element in response to the second scan signal of the second gate line.

A display panel according to some aspects, including a plurality of pixel blocks, each including a plurality of subpixels disposed in a display area; and a control circuit disposed in a bezel area outside the display area and configured to supply a first mode control signal and a second mode control signal to the plurality of pixel blocks, wherein each of the plurality of subpixels includes: a first light-emitting element connected to a driving transistor through a first mode control transistor controlled by the first mode control signal; a second light-emitting element connected to the driving transistor through a second mode control transistor controlled by the second mode control signal; a first lens area disposed on the first light-emitting element; and a second lens area disposed on the second light-emitting element, wherein the first lens area and the second lens area are configured to differently control a viewing angle in a first direction.

In the display panel according to some aspects, the control circuit is configured to supply the first mode control signal and the second mode control signal to the plurality of pixel blocks, according to a user request or contents to be displayed.

A display panel according to some aspects, including the above display panel.

The above-described feature, structure, and effect of the present disclosure are included in at least one embodiment of the present disclosure, but are not limited to only one embodiment. Furthermore, the feature, structure, and effect described in at least one embodiment of the present disclosure may be implemented through combination or modification of other embodiments by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosures. Thus, it is intended that the present disclosure covers the modifications and variations of this disclosure.

A display panel may be summarized as including a plurality of pixel blocks including a plurality of subpixels disposed in a display area; and a plurality of multiplexer circuits disposed in a bezel area outside the display area and individually connected to the plurality of pixel blocks, wherein each of the plurality of multiplexer circuits supplies a first mode control signal and a second mode control signal to a corresponding one of the plurality of pixel blocks, each of the plurality of subpixels includes: a first light-emitting element connected to a driving transistor through a first mode control transistor controlled by the first mode control signal; a second light-emitting element connected to the driving transistor through a second mode control transistor controlled by the second mode control signal; a first lens area disposed on the first light-emitting element; and a second lens area disposed on the second light-emitting element.

The first lens area and the second lens area may be configured to differently control a viewing angle in a first direction.

Each subpixel may control a viewing angle in the first direction at a wide viewing angle through the first lens area as the first light-emitting element is driven when the first mode control signal is activated, and may control the viewing angle in the first direction at a narrow viewing angle narrower than the wide viewing angle through the second lens area as the second light-emitting element is driven when the second mode control signal is activated.

Each of the plurality of multiplexer circuits may selectively output a gate-on voltage and a gate-off voltage as the first and second mode may control signals in response to a control signal.

Each of the plurality of multiplexer circuits may output a gate-on voltage as the first mode control signal and may output a gate-off voltage as the second mode control signal in response to a control signal indicating a wide viewing angle mode.

Each of the plurality of multiplexer circuits may output a gate-on voltage as the second mode control signal and may output a gate-off voltage as the first mode control signal in response to a control signal indicating a narrow viewing angle mode.

Each of the plurality of multiplexer circuits may include a first switching element outputting a gate-on voltage as the second mode control signal in response to a control signal; a second switching element outputting a gate-off voltage as the second mode control signal in response to an inverted control signal opposite to the control signal; a third switching element outputting the gate-on voltage as the first mode control signal in response to the inverted control signal; and a fourth switching element outputting the gate-off voltage as the first mode control signal in response to the control signal.

Each subpixel may further include a storage capacitor connected to a gate electrode of the driving transistor; a first switching transistor supplying a data voltage of a data line to a first electrode of the storage capacitor in response to a first scan signal of a first gate line; a second switching transistor connecting the driving transistor to a diode structure in response to a second scan signal of a second gate line; a third switching transistor supplying an initialization voltage of an initialization voltage line to the first electrode of the storage capacitor in response to an emission control signal of a third gate line; a fourth switching transistor connecting the driving transistor with the first and second mode control transistors in response to the emission control signal of the third gate line; a fifth switching transistor supplying the initialization voltage of the initialization voltage line to an anode electrode of the second light-emitting element in response to the second scan signal of the second gate line; and a seventh switching transistor supplying the initialization voltage of the initialization voltage line to an anode electrode of the first light-emitting element in response to the second scan signal of the second gate line.

The first light-emitting element may include a first light emission area, and the first lens area may include a first lens, and the first lens may overlap the first light emission area, may have a bottom surface wider than the first light emission area, may control a viewing angle in the first direction at a wide viewing angle, and may control a viewing angle in a second direction perpendicular to the first direction at a narrow viewing angle.

The second light-emitting element may include a plurality of second light emission areas, and the second lens area may include a plurality of second lenses that overlap the plurality of second light emission areas, respectively, and each of the plurality of second lenses may have a bottom surface wider than each of the plurality of second light emission areas and may control a viewing angle in the first direction and a second direction perpendicular to the first direction at a narrow viewing angle.

The plurality of subpixels may include a first colored subpixel, a second colored subpixel and a third colored subpixel, the first lens area incudes a first lens, and the second lens area includes a plurality of second lenses, a size of the first lens is different for each of the first, second and third colored subpixels, and the number of the second lenses is different for each of the first, second and third colored subpixels.

A display apparatus may be summarized as including a display panel including a plurality of pixel blocks including a plurality of subpixels disposed in a display area and a plurality of multiplexer circuits disposed in a bezel area outside the display area, supplying first and second mode control signals to each of the plurality of pixel blocks; and a data driver disposed in the bezel area, driving data lines disposed in the display area, wherein each of the multiplexer circuits activates one of the first mode control signal and the second mode control signal in response to a control signal, each of the plurality of subpixels includes: a first light-emitting element connected to a driving transistor through a first mode control transistor controlled by the first mode control signal; a second light-emitting element connected to the driving transistor through a second mode control transistor controlled by the second mode control signal; a first lens area disposed on the first light-emitting element; and a second lens area disposed on the second light-emitting element.

The first lens area and the second lens area may be configured to differently control a viewing angle in a first direction.

Each subpixel may control a viewing angle in the first direction at a wide viewing angle through the first lens area as the first light-emitting element is driven when the first mode control signal is activated, and may control the viewing angle in the first direction at a narrow viewing angle narrower than the wide viewing angle through the second lens area as the second light-emitting element is driven when the second mode control signal is activated.

Each of the plurality of multiplexer circuits may be supplied with the control signal from any one of the data driver and a timing controller for controlling the data driver.

Each of the plurality of multiplexer circuits may selectively output a gate-on voltage and a gate-off voltage as the first and second mode control signals in response to the control signal.

Each of the plurality of multiplexer circuits may output a gate-on voltage as the first mode control signal and may output a gate-off voltage as the second mode control signal in response to the control signal indicating a wide viewing angle mode.

Each of the plurality of multiplexer circuits may output a gate-on voltage as the second mode control signal and may output a gate-off voltage as the first mode control signal in response to the control signal indicating a narrow viewing angle mode.

Each of the plurality of multiplexer circuits may include a first switching element outputting a gate-on voltage as the second mode control signal in response to the control signal; a second switching element outputting a gate-off voltage as the second mode control signal in response to an inverted control signal opposite to the control signal; a third switching element outputting the gate-on voltage as the first mode control signal in response to the inverted control signal; and a fourth switching element outputting the gate-off voltage as the first mode control signal in response to the control signal.

Each subpixel further may include a storage capacitor connected to a gate electrode of the driving transistor; a first switching transistor supplying a data voltage of a data line to a first electrode of the storage capacitor in response to a first scan signal of a first gate line; a second switching transistor connecting the driving transistor to a diode structure in response to a second scan signal of a second gate line; a third switching transistor supplying an initialization voltage of an initialization voltage line to the first electrode of the storage capacitor in response to an emission control signal of a third gate line; a fourth switching transistor connecting the driving transistor with the first and second mode control transistors in response to the emission control signal of the third gate line; a fifth switching transistor supplying the initialization voltage of the initialization voltage line to an anode electrode of the second light-emitting element in response to the second scan signal of the second gate line; and a seventh switching transistor supplying the initialization voltage of the initialization voltage line to an anode electrode of the first light-emitting element in response to the second scan signal of the second gate line.

A display panel may be summarized as including a plurality of pixel blocks, each including a plurality of subpixels disposed in a display area; and a control circuit disposed in a bezel area outside the display area and configured to supply a first mode control signal and a second mode control signal to the plurality of pixel blocks, wherein each of the plurality of subpixels includes: a first light-emitting element connected to a driving transistor through a first mode control transistor controlled by the first mode control signal; a second light-emitting element connected to the driving transistor through a second mode control transistor controlled by the second mode control signal; a first lens area disposed on the first light-emitting element; and a second lens area disposed on the second light-emitting element, wherein the first lens area and the second lens area are configured to differently control a viewing angle in a first direction.

The control circuit may be configured to supply the first mode control signal and the second mode control signal to the plurality of pixel may block, according to a user request or contents to be displayed.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display panel, comprising:

a plurality of pixel blocks, each including a plurality of subpixels disposed in a display area; and a control circuit disposed in a bezel area adjacent to the display area and configured to supply a first mode control signal and a second mode control signal to the plurality of pixel blocks, wherein each of the plurality of subpixels includes:

a first light-emitting element connected to a driving transistor through a first mode control transistor controlled by the first mode control signal;

a second light-emitting element connected to the driving transistor through a second mode control transistor controlled by the second mode control signal;

a first lens area disposed on the first light-emitting element, the first lens area including at least one lens; and a second lens area disposed on the second light-emitting element, the second lens area including at least one lens, wherein the at least one lens of the first lens area and the second lens area are configured to differently control a viewing angle in a first direction, wherein a viewing angle of each of the plurality of pixel blocks is independently controlled by the control circuit, wherein the plurality of pixel blocks including a first display area including a first pixel block providing a first viewing angle, and a second display area including a second pixel block providing a second viewing angle, and wherein at least one of positions of the first display area and the second display area, and a ratio of regions of the first display area and the second display area are adjusted.

2. The display panel of claim 1, wherein the control circuit is configured to supply the first mode control signal and the second mode control signal to the plurality of pixel blocks, based on a user request or contents to be displayed.

3. A display panel, comprising:

a plurality of pixel blocks including a plurality of subpixels disposed in a display area; and a plurality of multiplexer circuits disposed in a bezel area adjacent to the display area and individually connected to the plurality of pixel blocks, wherein each of the plurality of multiplexer circuits supplies a first mode control signal and a second mode control signal to a corresponding one of the plurality of pixel blocks, each of the plurality of subpixels includes:

a first light-emitting element connected to a driving transistor through a first mode control transistor controlled by the first mode control signal;

a second light-emitting element connected to the driving transistor through a second mode control transistor controlled by the second mode control signal;

a first lens area disposed on the first light-emitting element, the first lens area including at least one lens; and a second lens area disposed on the second light-emitting element, the second lens area including at least one lens, wherein a viewing angle of each of the plurality of pixel blocks is independently controlled by each of the plurality of multiplexer circuits, wherein the plurality of pixel blocks including a first display area including a first pixel block providing a first viewing angle, and a second display area including a second pixel block providing a second viewing angle, and wherein at least one of the positions of the first display area and the second display area, and a ratio of regions of the first display area and the second display area are adjusted.

4. The display panel of claim 3, wherein the at least one lens included in the first lens area and the second lens area are configured to differently control a viewing angle in a first direction.

5. The display panel of claim 4, wherein each subpixel controls a viewing angle in the first direction at a wide viewing angle through the first lens area as the first light -emitting element is driven when the first mode control signal is activated, and controls the viewing angle in the first direction at a narrow viewing angle narrower than the wide viewing angle through the second lens area as the second light-emitting element is driven when the second mode control signal is activated.

6. The display panel of claim 4, wherein each of the plurality of multiplexer circuits selectively outputs a gate-on voltage and a gate-off voltage as the first and second mode control signals based on a control signal.

7. The display panel of claim 4, wherein each of the plurality of multiplexer circuits outputs a gate-on voltage as the first mode control signal and outputs a gate -off voltage as the second mode control signal based on a control signal indicating a wide viewing angle mode.

8. The display panel of claim 4, wherein each of the plurality of multiplexer circuits outputs a gate-on voltage as the second mode control signal and outputs a gate-off voltage as the first mode control signal based on a control signal indicating a narrow viewing angle mode.

9. The display panel of claim 4, wherein each of the plurality of multiplexer circuits includes:

a first switching element outputting a gate-on voltage as the second mode control signal based on a control signal;

a second switching element outputting a gate-off voltage as the second mode control signal based on an inverted control signal opposite to the control signal;

a third switching element outputting the gate-on voltage as the first mode control signal based on the inverted control signal; and a fourth switching element outputting the gate-off voltage as the first mode control signal based on the control signal.

10. The display panel of claim 4, wherein each subpixel further includes:

a storage capacitor connected to a gate electrode of the driving transistor;

a first switching transistor supplying a data voltage of a data line to a first electrode of the storage capacitor based on a first scan signal of a first gate line;

a second switching transistor connecting the driving transistor to a diode structure based on a second scan signal of a second gate line;

a third switching transistor supplying an initialization voltage of an initialization voltage line to the first electrode of the storage capacitor based on an emission control signal of a third gate line;

a fourth switching transistor connecting the driving transistor with the first and second mode control transistors based on the emission control signal of the third gate line;

a fifth switching transistor supplying the initialization voltage of the initialization voltage line to an anode electrode of the second light-emitting element based on the second scan signal of the second gate line; and a seventh switching transistor supplying the initialization voltage of the initialization voltage line to an anode electrode of the first light-emitting element based on the second scan signal of the second gate line.

11. The display panel of claim 4, wherein:

the first light-emitting element includes a first light emission area, and the first lens area includes a first lens; and the first lens overlaps the first light emission area, has a bottom surface wider than the first light emission area, controls a viewing angle in the first direction at a wide viewing angle, and controls a viewing angle in a second direction perpendicular to the first direction at a narrow viewing angle.

12. The display panel of claim 4, wherein:

the second light-emitting element includes a plurality of second light emission areas, and the second lens area includes a plurality of second lenses that overlap the plurality of second light emission areas, respectively; and each of the plurality of second lenses has a bottom surface wider than each of the plurality of second light emission areas and controls a viewing angle in the first direction and a second direction perpendicular to the first direction at a narrow viewing angle.

13. The display panel of claim 4, wherein:

the plurality of subpixels includes a first colored subpixel, a second colored subpixel and a third colored subpixel;

the first lens area includes a first lens, and the second lens area includes a plurality of second lenses;

a size of the first lens is different for each of the first, second and third colored subpixels; and a number of the second lenses is different for each of the first, second and third colored subpixels.

14. A display apparatus, comprising:

a display panel including a plurality of pixel blocks including a plurality of subpixels disposed in a display area and a plurality of multiplexer circuits disposed in a bezel area adjacent to the display area, supplying first and second mode control signals to each of the plurality of pixel blocks; and a data driver disposed in the bezel area, driving data lines disposed in the display area, wherein each of the multiplexer circuits activates one of the first mode control signal and the second mode control signal based on a control signal, each of the plurality of subpixels includes:

a first light-emitting element connected to a driving transistor through a first mode control transistor controlled by the first mode control signal;

a second light-emitting element connected to the driving transistor through a second mode control transistor controlled by the second mode control signal;

a first lens area disposed on the first light-emitting element, the first lens area including at least one lens; and a second lens area disposed on the second light-emitting element, the second lens area including at least one lens, wherein a viewing angle of each of the plurality of pixel blocks is independently controlled by each of the plurality of multiplexer circuits, wherein the plurality of pixel blocks including a first display area including a first pixel block providing a first viewing angle, and a second display area including a second pixel block providing a second viewing angle, and wherein at least one of positions of the first display area and the second display area, and a ratio of regions of the first display area and the second display area are adjusted.

15. The display apparatus of claim 14, wherein the at least one lens of the first lens area and the second lens area are configured to differently control a viewing angle in a first direction.

16. The display apparatus of claim 15, wherein each subpixel controls a viewing angle in the first direction at a wide viewing angle through the first lens area as the first light-emitting element is driven when the first mode control signal is activated, and controls the viewing angle in the first direction at a narrow viewing angle narrower than the wide viewing angle through the second lens area as the second light-emitting element is driven when the second mode control signal is activated.

17. The display apparatus of claim 15, wherein each of the plurality of multiplexer circuits is supplied with the control signal from any one of the data driver and a timing controller for controlling the data driver.

18. The display apparatus of claim 15, wherein each of the plurality of multiplexer circuits selectively outputs a gate-on voltage and a gate-off voltage as the first and second mode control signals based on the control signal.

19. The display apparatus of claim 15, wherein each of the plurality of multiplexer circuits outputs a gate-on voltage as the first mode control signal and outputs a gate -off voltage as the second mode control signal based on the control signal indicating a wide viewing angle mode.

20. The display apparatus of claim 15, wherein each of the plurality of multiplexer circuits outputs a gate-on voltage as the second mode control signal and outputs a gate-off voltage as the first mode control signal based on the control signal indicating a narrow viewing angle mode.

21. The display apparatus of claim 15, wherein each of the plurality of multiplexer circuits includes:

a first switching element outputting a gate-on voltage as the second mode control signal based on the control signal;

a second switching element outputting a gate-off voltage as the second mode control signal based on an inverted control signal opposite to the control signal;

a third switching element outputting the gate-on voltage as the first mode control signal based on the inverted control signal; and a fourth switching element outputting the gate-off voltage as the first mode control signal based on the control signal.

22. The display apparatus of claim 15, wherein each subpixel further includes:

a storage capacitor connected to a gate electrode of the driving transistor;

a first switching transistor supplying a data voltage of a data line to a first electrode of the storage capacitor based on a first scan signal of a first gate line;

a second switching transistor connecting the driving transistor to a diode structure based on a second scan signal of a second gate line;

a third switching transistor supplying an initialization voltage of an initialization voltage line to the first electrode of the storage capacitor based on an emission control signal of a third gate line;

a fourth switching transistor connecting the driving transistor with the first and second mode control transistors based on the emission control signal of the third gate line;

a fifth switching transistor supplying the initialization voltage of the initialization voltage line to an anode electrode of the second light-emitting element based on the second scan signal of the second gate line; and a seventh switching transistor supplying the initialization voltage of the initialization voltage line to an anode electrode of the first light-emitting element based on the second scan signal of the second gate line.

* * * * *